(12) United States Patent
Park et al.

(10) Patent No.: US 11,177,733 B2
(45) Date of Patent: Nov. 16, 2021

(54) ELECTRONIC DEVICE FOR CONTROLLING VOLTAGE CONVERSION MODE AND OPERATION METHOD THEREOF

(71) Applicant: Samsung Electronics Co., Ltd., Suwon-si (KR)

(72) Inventors: Sungchul Park, Suwon-si (KR); Dongil Son, Suwon-si (KR); Suha Yoon, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/999,644

(22) Filed: Aug. 21, 2020

(65) Prior Publication Data

US 2021/0111622 A1    Apr. 15, 2021

(30) Foreign Application Priority Data

Oct. 11, 2019 (KR) .................. 10-2019-0126384

(51) Int. Cl.
*H02M 1/14* (2006.01)
*H02M 3/158* (2006.01)
(Continued)

(52) U.S. Cl.
CPC ........... *H02M 1/143* (2013.01); *H02M 3/158* (2013.01); *H04L 1/0003* (2013.01); *H04L 27/12* (2013.01)

(58) Field of Classification Search
CPC .................................................. H04L 25/4902
(Continued)

(56) References Cited

U.S. PATENT DOCUMENTS 9,804,664 B2    10/2017    Homchaudhuri et al.
9,941,787 B2    4/2018    Kawano et al.
(Continued)

FOREIGN PATENT DOCUMENTS

JP    2009-033591 A    2/2009
JP    2009-055751 A    3/2009
(Continued)

OTHER PUBLICATIONS

International Search Report dated Dec. 1, 2020; International Appln. No. PCT/KR2020/011191.

(Continued)

*Primary Examiner* — Shuwang Liu
*Assistant Examiner* — Gina M McKie
(74) *Attorney, Agent, or Firm* — Jefferson IP Law, LLP

(57) ABSTRACT

An apparatus and a method for controlling a voltage conversion mode in an electronic device are provided. The electronic device includes a power management module, a communication processor, and at least one processor operably connected to the communication processor, wherein the at least one processor identifies a modulation order used for communication with an external device, in a case that communication with the external device is performed using a wireless resource, and configures, based on the modulation order, a voltage conversion mode of the power management module that supplies power to the communication processor to a pulse frequency modulation (PFM) mode or a pulse width modulation (PWM) mode.

18 Claims, 18 Drawing Sheets

(51) Int. Cl.
  *H04L 1/00* (2006.01)
  *H04L 27/12* (2006.01)
(58) Field of Classification Search
  USPC .......................................................... 375/238
  See application file for complete search history.

(56) References Cited

U.S. PATENT DOCUMENTS

| | | | |
|---|---|---|---|
| 2007/0274108 A1* | 11/2007 | Jacques | H02M 3/33507 363/21.12 |
| 2008/0225563 A1* | 9/2008 | Seo | H02M 3/156 363/123 |
| 2010/0066322 A1* | 3/2010 | Buethker | H02M 3/1582 323/282 |
| 2010/0169030 A1* | 7/2010 | Parlos | G01H 1/00 702/58 |
| 2013/0028300 A1 | 1/2013 | Alberth et al. | |
| 2018/0227075 A1 | 8/2018 | Xia et al. | |
| 2018/0241440 A1 | 8/2018 | Myoung et al. | |
| 2019/0238054 A1* | 8/2019 | Flaibani | H03K 7/06 |

FOREIGN PATENT DOCUMENTS

| | | |
|---|---|---|
| JP | 2011-114992 A | 6/2011 |
| JP | 2017-121098 A | 7/2017 |
| KR | 10-2018-0097109 A | 8/2018 |

OTHER PUBLICATIONS

European Search Report dated Mar. 1, 2021; European Appln. No. 20200912.2-1216.

* cited by examiner

ELECTRONIC DEVICE FOR CONTROLLING VOLTAGE CONVERSION MODE AND OPERATION METHOD THEREOF

CROSS-REFERENCE TO RELATED APPLICATION(S)

This application is based on and claims priority under 35 U.S.C. § 119(a) of a Korean patent application number 10-2019-0126384, filed on Oct. 11, 2019, in the Korean Intellectual Property Office, the disclosure of which is incorporated by reference herein in its entirety.

BACKGROUND

1. Field

The disclosure relates to an apparatus and a method for controlling a voltage conversion mode in an electronic device.

2. Description of Related Art

An electronic device may include a voltage converter for stably supplying a voltage of a predetermined level to an internal circuit. A voltage converter may include a direct-current/direct-current (DC-DC) converter which converts, to a direct current voltage of a predetermined level (for example: 5 V), a direct current voltage supplied from a battery of an external device or an external power source and outputs the converted direct current voltage. For example, a DC-DC converter may support a buck conversion function of decreasing a voltage of an input power source to a predetermined level or a boosting conversion function of increasing a voltage of an input power source to a predetermined level.

The above information is presented as background information only to assist with an understanding of the disclosure. No determination has been made, and no assertion is made, as to whether any of the above might be applicable as prior art with regard to the disclosure.

SUMMARY

A direct-current/direct-current (DC-DC) converter may convert an input voltage to a voltage of a predetermined level by using a pulse frequency modulation (PFM) mode or a pulse width modulation (PWM) mode. A PFM mode has relatively good voltage conversion efficiency and is thus advantageous in terms of consumed currents. However, the supply of a relatively high load current is limited, and noise may relatively occur much. A PWM mode supports a relatively high load current, and noise relatively occurs less. However, a PWM mode has relatively low conversion efficiency and may thus be disadvantageous in terms of consumed currents.

In a case that an electronic device configures a voltage conversion mode of a DC-DC converter to a PFM mode, noise occurring from the DC-DC converter affects communication performance, and thus a transmission rate (a throughput) may decrease. In a case that an electronic device configures a voltage conversion mode of a DC-DC converter to a PWM mode, conversion efficiency is low, and thus consumed currents may increase.

Aspects of the disclosure are to address at least the above-mentioned problems and/or disadvantages and to provide at least the advantages described below. Accordingly, an aspect of the disclosure is to provide an apparatus and a method for controlling a voltage conversion mode so as to enhance communication efficiency while reducing current consumption in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a power management module, a communication processor, and at least one processor operably connected to the communication processor, wherein the at least one processor identifies a modulation order used for communication with an external device, in a case that communication with the external device is performed using a wireless resource, and configures, based on the modulation order, a voltage conversion mode of the power management module that supplies power to the communication processor to a pulse frequency modulation (PFM) mode or a pulse width modulation (PWM) mode.

In accordance with another aspect of the disclosure, a method for operating an electronic device is provided. The method includes identifying a modulation order used for communication with an external device, in a case that communication with the external device is performed using a wireless resource, and configuring, based on the modulation order, a voltage conversion mode of a power management module that supplies power to a communication processor included in the electronic device to a PFM mode or a PWM mode.

In accordance with another aspect of the disclosure, an electronic device is provided. The electronic device includes a power management module, a communication processor, and at least one processor operably connected to the communication processor, wherein the at least one processor identifies whether wireless communication with an external device has been configured to ultra-reliable low latency communication (URLLC), and configures, based on whether the URLLC has been configured, a voltage conversion mode of the power management module that supplies power to the communication processor to a PFM mode or a PWM mode.

In accordance with another aspect of the disclosure, a method for operating an electronic device is provided. The method includes identifying whether wireless communication with an external device has been configured to URLLC, and configuring, based on whether the URLLC has been configured, a voltage conversion mode of a power management module that supplies power to a communication processor included in the electronic device to a PFM mode or a PWM mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of the various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
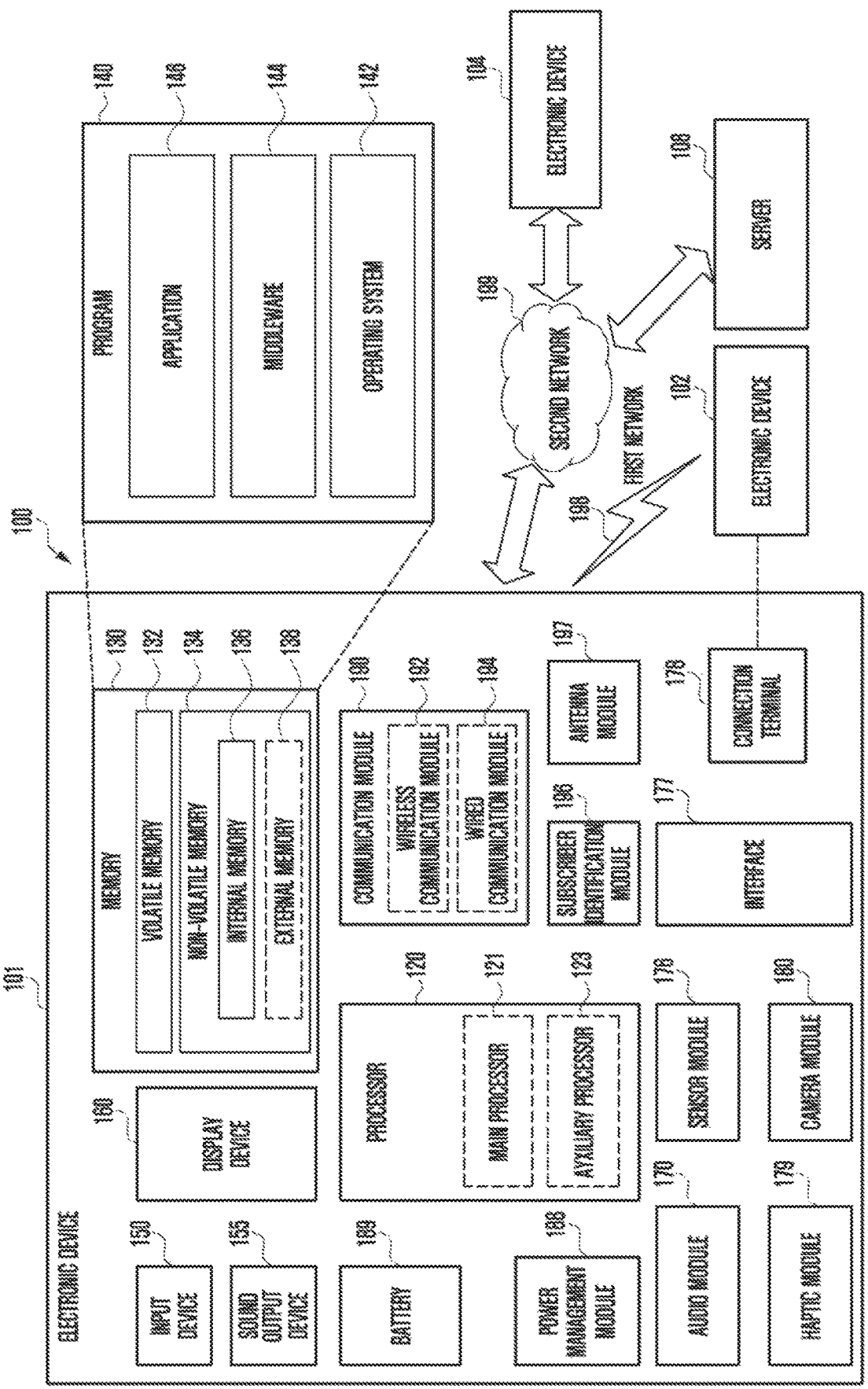
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an example embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
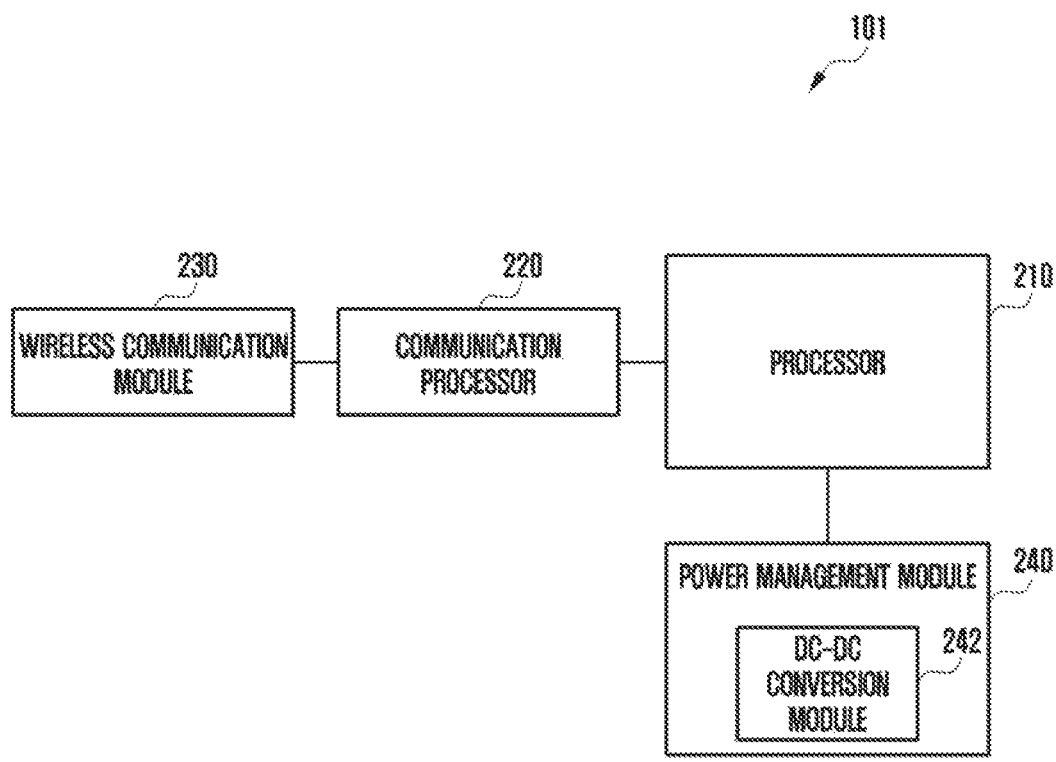
FIG. 2 is a block diagram of an electronic device for controlling a voltage conversion mode according to an embodiment of the disclosure.

FIG. 2 is a block diagram of an electronic device 101 for controlling a voltage conversion mode according to an embodiment of the disclosure. Hereinafter, at least a partial composition of FIG. 2 will be described with reference to FIG. 3, FIG. 4, FIG. 5A, FIG. 5B, FIG. 6A, or FIG. 6B.

Figure 3:
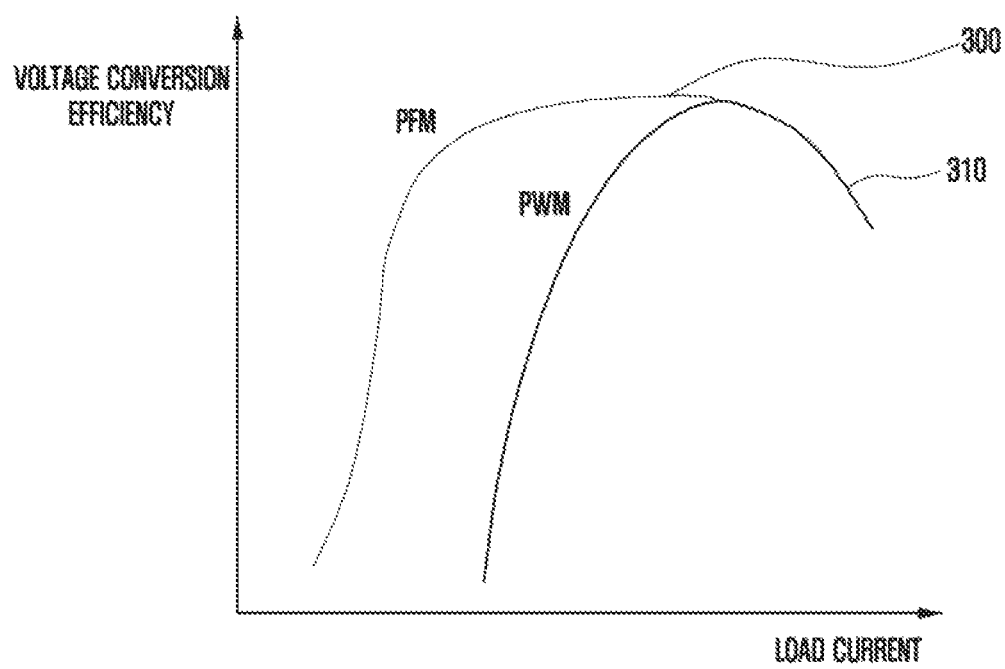
FIG. 3 is a graph illustrating conversion efficiency of a voltage conversion mode according to an embodiment of the disclosure.

FIG. 3 is a graph illustrating conversion efficiency of a voltage conversion mode according to various embodiments of the disclosure.

Figure 4:
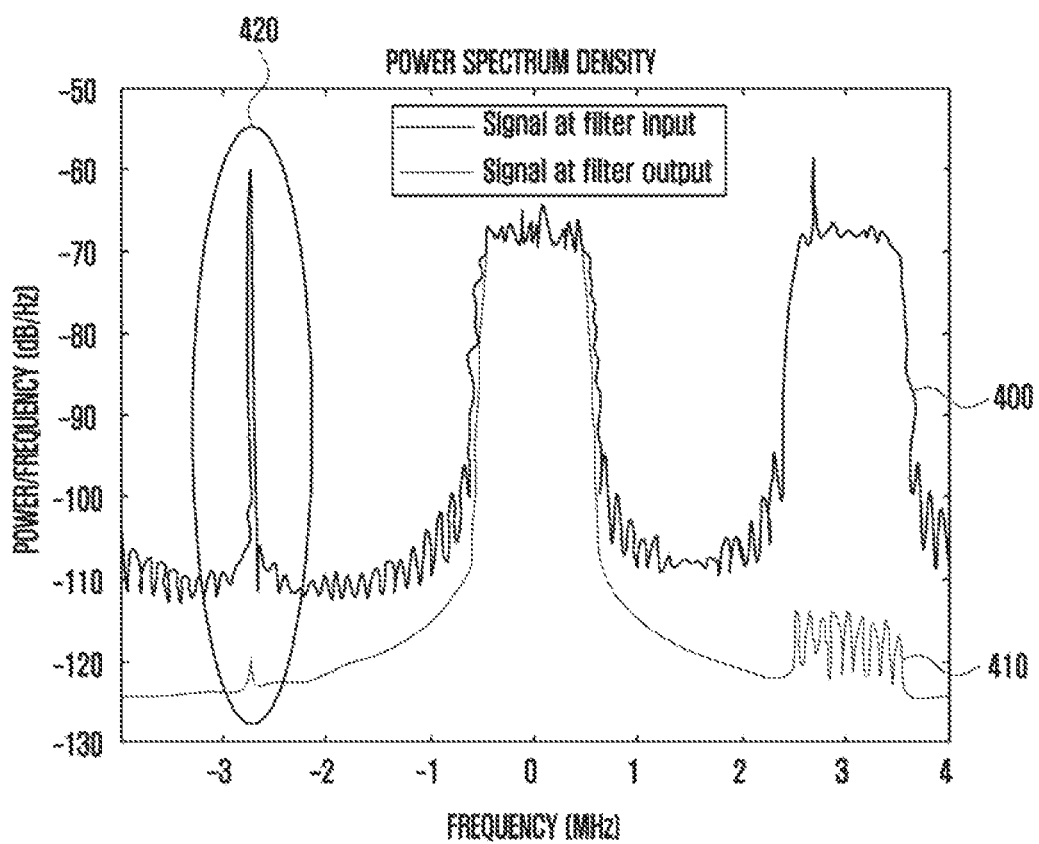
FIG. 4 is a graph illustrating power spectrum density in accordance with a PFM mode according to an embodiment of the disclosure.

FIG. 4 is a graph illustrating power spectrum density in accordance with a PFM mode according to an embodiment of the disclosure.

Figure 5A:
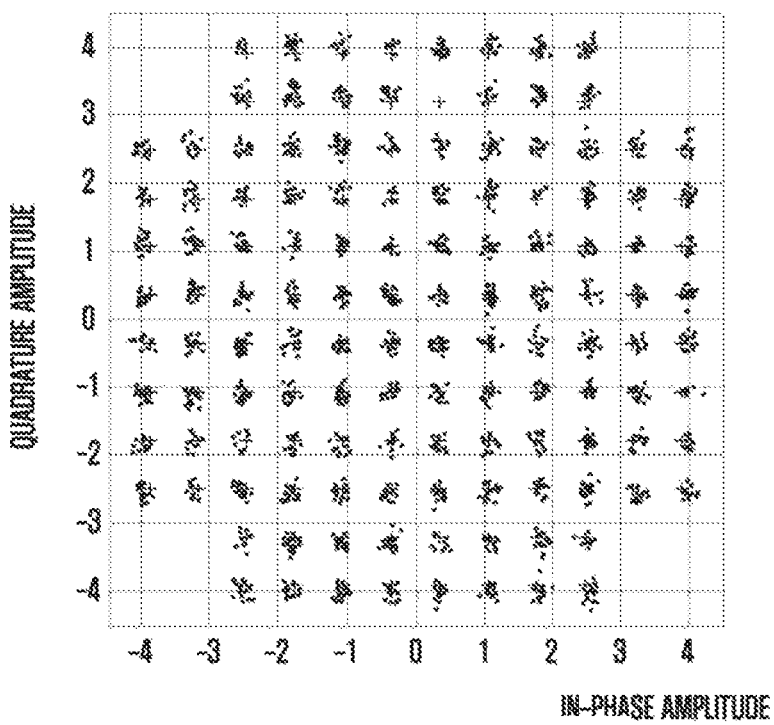
FIGS. 5A and 5B are a constellation illustrating an influence of interference in a case that a first modulation mode is used according to various embodiments of the disclosure.
Figure 5B:
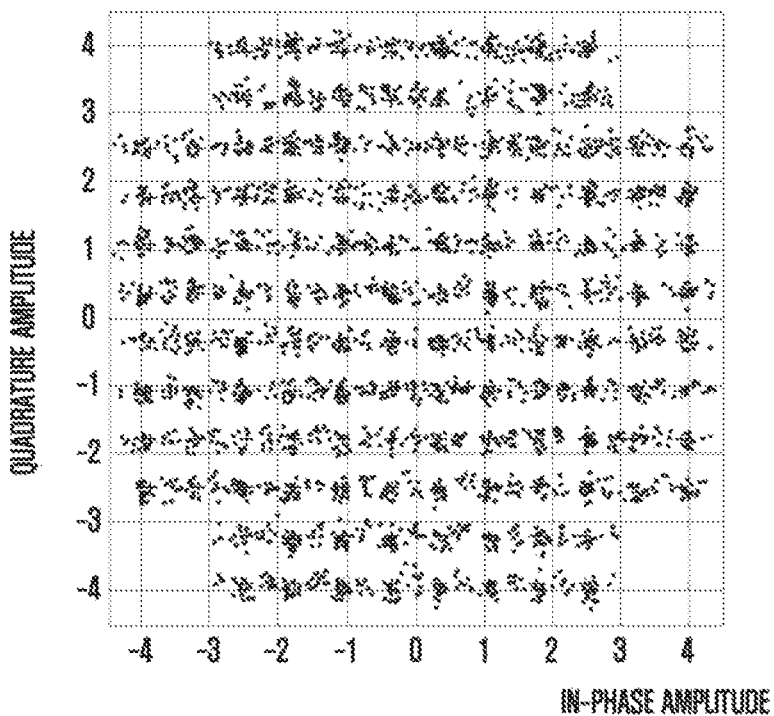

FIGS. 5A and 5B are a constellation illustrating an influence of interference in a case that a first modulation mode is used according to various embodiments of the disclosure.

Figure 6A:
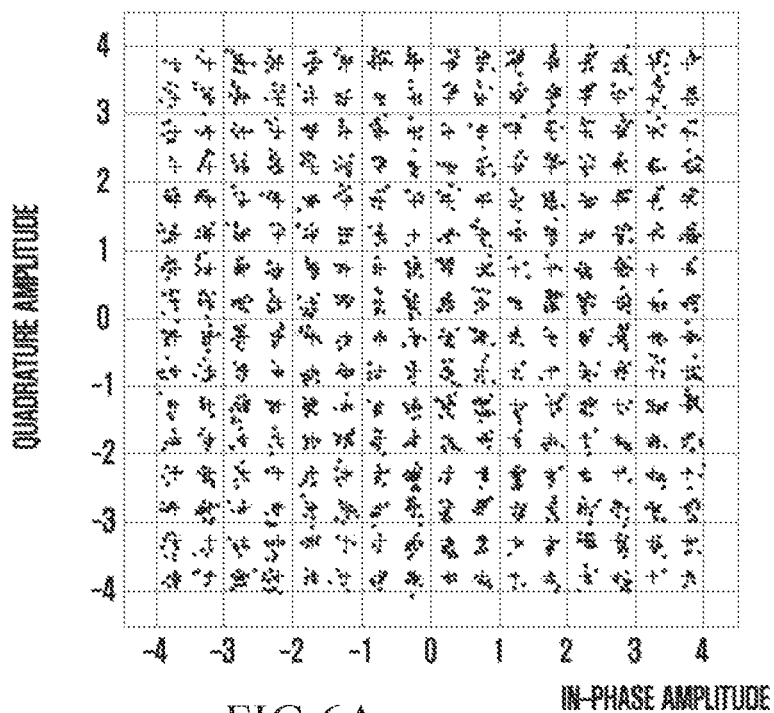
FIGS. 6A and 6B are a constellation illustrating an influence of interference in a case that a second modulation mode is used according to various embodiments of the disclosure.
Figure 6B:
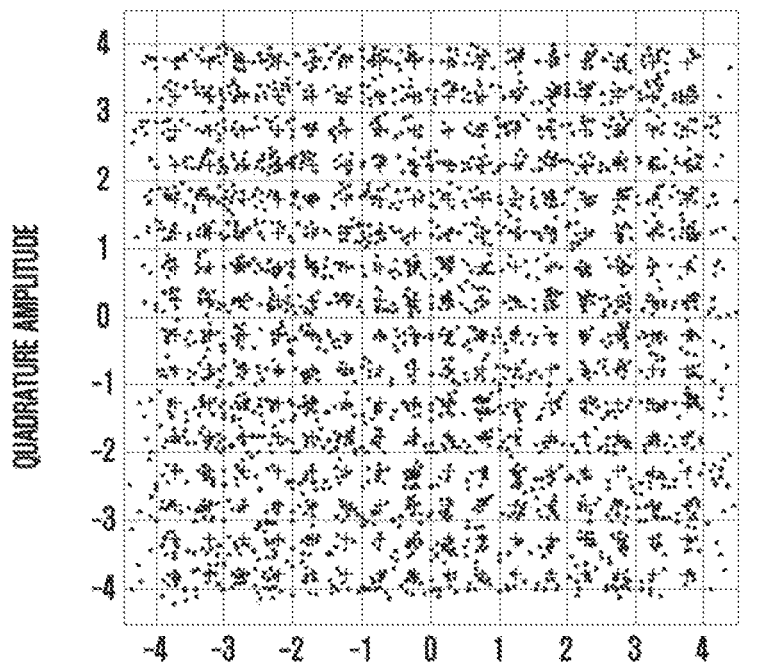

FIGS. 6A and 6B are a constellation illustrating an influence of interference in a case that a second modulation mode is used according to various embodiments of the disclosure.

Referring to FIG. 2, an electronic device 101 may include a processor 210, a communication processor 220, a wireless communication module 230, and a power management module 240. According to an embodiment of the disclosure, a processor 210 may be the same as a main processor 121 of FIG. 1 or may be included in the main processor 121. A communication processor (CP) 220 may be the same as an auxiliary processor 122 of FIG. 1 or may be included in the auxiliary processor 122. A wireless communication module 230 may be the same as a wireless communication module 192 of FIG. 1 or may be included in the wireless communication module 192. A power management module 240 may be the same as a power management module 188 of FIG. 1 or may be included in the power management module 188.

According to various embodiments of the disclosure, a processor 210 may control a voltage conversion mode of a power management module 240. For example, a voltage conversion mode of a power management module 240 may include a mode for converting a voltage to be supplied to an internal circuit (for example: a communication processor 220) of an electronic device 101 to a designated level.

According to an embodiment of the disclosure, a processor 210 may configure a voltage conversion mode of a DC-DC conversion module 242 for supplying power to an internal circuit (for example: a communication processor 220) of an electronic device 101 based on a load current related to a power source of the electronic device 101. As an example, a voltage conversion mode may include at least one among a pulse frequency modulation (PFM) mode or a pulse width modulation (PWM) mode.

According to an embodiment of the disclosure, in a case that a processor 210 performs wireless communication with an external electronic device through a wireless communication module 230, a voltage conversion mode of a DC-DC conversion module 242 for supplying power to an internal circuit (for example: a communication processor 220) of an electronic device 101 may be configured based on a modulation order for wireless communication. For example, voltage conversion efficiency of a PFM mode 300 may be maintained relatively greater than voltage conversion efficiency of a PWM mode 310, as shown in FIG. 3. A PFM mode 300 may maintain relatively high voltage conversion efficiency at a relatively low load current than a PWM mode 310. As an example, in FIG. 3, a horizontal axis may indicate a load current, and a vertical axis may indicate voltage conversion efficiency according to the load current. For example, in a case that it is assumed in a DC-DC conversion module 242 that a frequency (for example: 2.4 MHz) changed by a PFM mode is adjacent to a baseband, power spectrum density of a received signal may appear as shown in FIG. 4. FIG. 4 shows a characteristic in which an interference signal produced by a PFM mode is introduced to a baseband in an environment where noise power density (Eb/No: energy per bit/noise power spectrum density) is 40 dB, wherein a horizontal axis may indicate a frequency band, and a vertical axis may indicate a level of power with respect to a frequency. For example, power converted based on a PFM mode in a DC-DC conversion module 242 may include a peak value 420 in a band of 2.4 MHz, such as power spectrum density 400 before passing through a filter (for example: a band pass filter) and a power spectrum density 410 after filtering using a filter, as in FIG. 4. In this case, a peak value 420 in a band of 2.4 MHz may affect interference of a baseband signal. As an example, a modulation mode corresponding to a modulation order may be affected by interference, as shown in Table 1 below. For example, Table 1 may indicate a symbol error rate (SER) for each modulation mode depending on whether there is interference.

TABLE 1

| Modulation order | Without interference | With interference |
| --- | --- | --- |
| 16QAM | 0.0% | 0.0% |
| 32QAM | 0.0% | 0.0% |
| 64QAM | 0.0% | 2.0% |
| 128QAM | 0.0% | 26.1% |
| 256QAM | 2.0% | 73.6% |

As shown in Table 1, modulation modes from 16 quadrature amplitude modulation (QAM) to 64 QAM are not affected by interference or is relatively less affected by interference, and thus an SER may be maintained regardless of the presence or absence of interference. As shown in Table 1, in modulation orders from 128 QAM, an SER may rapidly worsen due to interference. For example, in case that a modulation mode of 128 QAM is not affected by interference, a received signal is clustered in a constellation according to the modulation mode, as shown in FIG. 5A. However, in case that a modulation mode of 128 QAM is affected by interference, a received signal is not clustered in a constellation according to the modulation mode, as shown in FIG. 5B, and thus an influence of interference on a symbol may be increased. For another example, in case that a modulation mode of 256 QAM is not affected by interference, a received signal is clustered in a constellation according to the modulation mode, as shown in FIG. 6A. However, in case that a modulation mode of 256 QAM is affected by interference, a received signal is not clustered in a constellation according to the modulation mode, as shown in FIG. 6B, and thus an influence of interference on a symbol may be increased. Accordingly, in case that a modulation mode which is less affected by interference is used, a processor 210 may configure a PFM mode as a voltage conversion mode of a DC-DC conversion module 242 so as to reduce power consumption. In case that a modulation mode which is affected by interference is used, a processor 210 may configure a voltage conversion mode of a DC-DC conversion module 242 to a PWM mode so as to maintain a transmission rate of wireless communication. As an example, a modulation order may include an index for indicating each modulation mode. As an example, a modulation order may be identified based on at least one among a channel quality indicator (CQI) index, a modulation coding scheme (MCS) index, or MCS table information. As an example, each of FIGS. 5A-5B and 6A-6B is for indicating a constellation of a received signal corresponding to a modulation mode, wherein a horizontal axis may indicate an in-phase amplitude, and a vertical axis may indicate a quadrature amplitude.

According to an embodiment of the disclosure, in case that a processor 210 performs wireless communication with an external electronic device through a wireless communication module 230, a voltage conversion mode of a DC-DC conversion module 242 for supplying power to an internal circuit (for example: a communication processor 220) of an electronic device 101 may be configured based on a signal-to-interference-and-noise ratio of a physical layer (L-SINR). As an example, an L1-SINR may include channel state information (for example: interference) identified by receiving at least one signal among a synchronization-signal/physical-broadcast-channel (SS/PBCH) block (SSB), a non-zero-power-channel-status-information-reference signal (NZP-CSI-RS), or a zero-power-CSI-RS (ZP-CSI-RS) of a physical layer L. An L-SINR may be calculated by a signal part (for example: an SSB or an NZP-CSI-RS) and an interference part (for example: at least one among a dedicated ZP-CSI-RS or an NZP-CSI-RS) by a reference signal designated by a base station. A reference signal designated by a base station may be used to report SS/PBCH-resource-block-indicator/CRS-RS-resource indicators (SSBRI/CRIs). The number of SSBRI/CRIs may be one to four at most.

According to an embodiment of the disclosure, in case that a processor 210 performs wireless communication with an external electronic device through a wireless communication module 230, a voltage conversion mode of a DC-DC conversion module 242 for supplying power to an internal circuit (for example: a communication processor 220) of an electronic device 101 may be configured based on whether ultra-reliable low latency communication (URLLC) is configured. As an example, whether URLLC is configured may be identified based on whether a modulation-coding-scheme-cell-radio-network temporary identifier (MCS-C-RNTI) parameter is included in radio resource control (RRC) signaling.

According to an embodiment of the disclosure, in case that RRC connection to an external electronic device (for example: a base station) is maintained through a wireless communication module 230, a processor 210 may configure, based on discontinuous reception (DRX) state information, a voltage conversion mode of a DC-DC conversion module 242 for supplying power to an internal circuit (for example: a communication processor 220) of an electronic device 101.

According to an embodiment of the disclosure, a processor 210 may configure, by a combination of at least two among a modulation order, a load current, an L1-SINR, whether URLLC is configured, DRX state information, a battery residual amount, or a received signal strength, a voltage conversion mode of a DC-DC conversion module 242 for supplying power to an internal circuit (for example: a communication processor 220) of an electronic device 101.

According to various embodiments of the disclosure, a processor 210 may adaptively configure a reference related to a changing in a voltage conversion mode so as to prevent frequent changes in a voltage conversion mode. According to an embodiment of the disclosure, in a processor 210, a reference when a first voltage conversion mode (for example: a PFM mode) is changed to a second voltage conversion mode (for example: a PWM mode) and a reference when the second voltage conversion mode is changed to the first voltage conversion mode may be differently configured. According to another embodiment of the disclosure, in case that a voltage conversion mode is changed, a processor 210 may perform control to maintain the voltage conversion mode for a reference time.

According to various embodiments of the disclosure, a communication processor 220 may control a wireless communication module 230 so as to transmit or receive a signal to or from an external electronic device through at least one network. As an example, a communication processor 220 may be driven based on power converted to a PFM mode or a PWM mode in a power management module 240.

According to various embodiments of the disclosure, a wireless communication module 230 may transmit or receive a signal to or from an external electronic device through at least one network. As an example, a wireless communication module 230 may include a radio frequency integrated circuit (RFC) and a radio frequency front end (RFFE). An RFIC may convert, to a radio signal, a baseband signal provided from a communication processor 220, or may convert, to a baseband signal, a radio signal provided from an RFFE. An RFFE may include processing for receiving or transmitting a signal through an antenna. For example, an RFFE may include an element for amplifying power of a signal or an element for removing noise.

According to various embodiments of the disclosure, a power management module 240 may control power supplied from a battery or an external power source to be supplied to an internal circuit (for example: an internal element) of an electronic device 101. According to an embodiment of the disclosure, a power management module 240 may stably supply a voltage of a predetermined level to an internal circuit (for example: a communication processor 220) of an electronic device 101 through a DC-DC conversion module 242.

According to various embodiments of the disclosure, a DC-DC conversion module 242 may convert a voltage to a PFM mode or a PWM mode and provide the voltage to an internal circuit (for example: a communication processor 220) of an electronic device 101. According to an embodiment of the disclosure, in case that a change in a voltage conversion mode is determined by a processor 210, a DC-DC conversion module 242 may change the voltage conversion mode at a time point at which the change in the voltage conversion mode is determined. According to an embodiment of the disclosure, in case that a change in a voltage conversion mode is determined by a processor 210, a DC-DC conversion module 242 may change a voltage conversion mode at a time point (for example: an idle state) at which data transmission/reception does not occur through a radio resource. As an example, a DC-DC conversion module 242 may be included in a power management module 240 or may be composed separately from the power management module 240.

According to various embodiments of the disclosure, in case of providing a $5^{th}$ generation (5G) (for example: new radio (NR)) communication service, a processor 210 may change a voltage conversion mode by using a long term evolution (LTE) network. According to an embodiment of the disclosure, in case that it is determined that a voltage conversion mode is changed during the provision of a 5G communication service composed in a non-standalone (NSA) mode, a processor 210 may change connection to a 5G network to connection to an LTE network. A processor 210 may change a voltage conversion mode while resetting a core of a 5G network. In case that rebooting of an electronic device 101 based on a change in a voltage conversion mode is completed, a processor 210 may access a 5G network.

According to various embodiments of the disclosure, an electronic device (for example: an electronic device 101 of FIG. 1 or FIG. 2) may include: a power management module (for example: a power management module 188 of FIG. 1 or a power management module 240 of FIG. 2), a communication processor (for example: an auxiliary processor 123 of FIG. 1 or a communication processor 220 of FIG. 2), and at least one processor (for example: a main processor 121 of FIG. 1 or a processor 210 of FIG. 2) operably connected to the communication processor, wherein the at least one processor identifies a modulation order used for communication with an external device, in case that communication with the external device is performed using a wireless resource, and configures, based on the modulation order, a voltage conversion mode of the power management module that supplies power to the communication processor to a pulse frequency modulation (PFM) mode or a pulse width modulation (PWM) mode.

According to various embodiments of the disclosure, the at least one processor may: configure a voltage conversion mode of the power management module to the PWM mode in case that the modulation order satisfies a designated condition, and configure a voltage conversion mode of the power management module to the PFM mode in case that the modulation order does not satisfy the designated condition.

According to various embodiments of the disclosure, the power management module may include a direct-current/direct-current (DC-DC) converter, and the voltage conversion mode may include a voltage conversion mode of the DC-DC converter.

According to various embodiments of the disclosure, the at least one processor may identify, based on at least one among a channel quality indicator (CQI) index or a modulation coding scheme (MCS) index, a modulation order used for communication with the external device.

According to various embodiments of the disclosure, the at least one processor may configure the voltage conversion mode to the PFM mode or the PWM mode by additionally considering at least one among a load current or a signal-to-interference-and-noise ratio (SINR) of a physical layer.

According to various embodiments of the disclosure, an electronic device (for example: an electronic device 101 of FIG. 1) may include a power management module (for example: a power management module 188), a communication processor (for example: an auxiliary processor 123), and at least one processor (for example: a main processor 121) operably connected to the communication processor, wherein the at least one processor identifies whether communication with an external device has been configured to ultra-reliable low latency communication (URLLC) in case that communication with the external device is performed using a wireless resource, and configures, based on whether the URLLC has been configured, a voltage conversion mode of the power management module that supplies power to the communication processor to a pulse frequency modulation (PFM) mode or a pulse width modulation (PWM) mode.

According to various embodiments of the disclosure, the at least one processor may: configure a voltage conversion mode of the power management module to the PWM mode in case that communication with the external device has been configured to URLLC, and configure a voltage conversion mode of the power management module to the PFM mode in case that communication with the external device has not been configured to URLLC.

According to various embodiments of the disclosure, the power management module may include a direct-current/direct-current (DC-DC) converter, and the voltage conversion mode may include a voltage conversion mode of the DC-DC converter.

According to various embodiments of the disclosure, the at least one processor may determine, based on whether a modulation-coding-scheme-cell-radio-network temporary identifier (MCS-C-RNTI) is included in radio resource control (RRC) signaling, whether communication with the external device has been configured to URLLC.

According to various embodiments of the disclosure, the at least one processor may configure the voltage conversion mode to the PFM mode or the PWM mode by additionally considering a battery residual amount of the electronic device.

Figure 7:
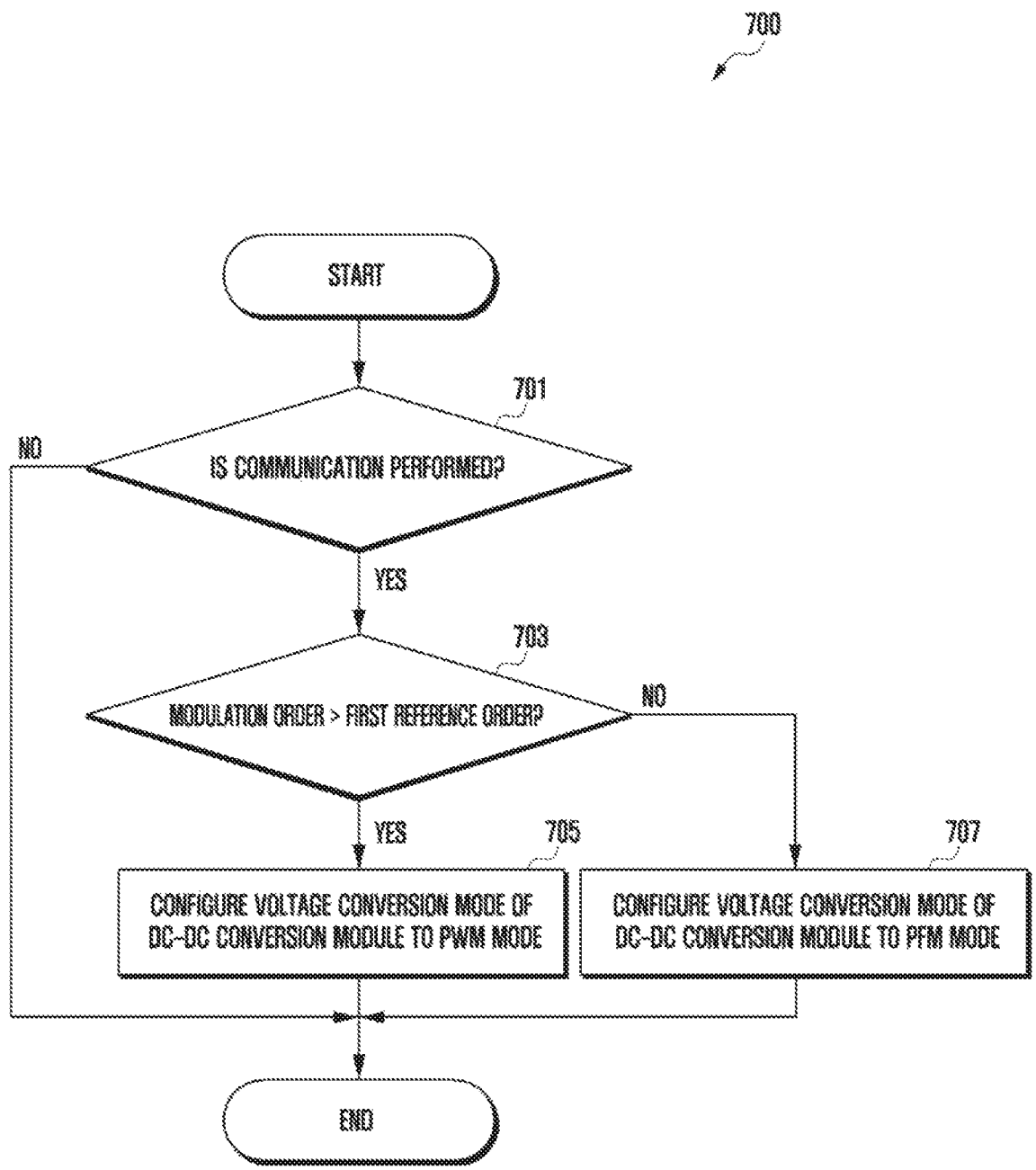
FIG. 7 is a flowchart for configuring, based on a modulation order, a voltage conversion mode in an electronic device according to an embodiment of the disclosure.

FIG. 7 is a flowchart 700 for configuring, based on a modulation order, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 7, according to various embodiments of the disclosure, in operation 701, an electronic device (for example: a processor 120 or a wireless communication module 192 of FIG. 1 or a communication processor 220 or a wireless communication module 230 of FIG. 2) may identify whether t communication with an external electronic device is performed. According to an embodiment of the disclosure, an electronic device 101 may identify whether a wireless channel with an external electronic device is established through a wireless communication module 192 or 230.

According to various embodiments of the disclosure, in case that an electronic device (for example: a processor 120 or 210) does not perform communication with an external electronic device (for example: "No" in operation 701), a voltage conversion mode for power supply of an electronic device 101 may be maintained, although not illustrated. According to an embodiment of the disclosure, a processor 120 or 210 may maintain a voltage conversion mode configured based on a load current.

According to various embodiments of the disclosure, in case that communication with an external electronic device (for example: "Yes" in operation 701) is performed, in operation 703, an electronic device (for example: a processor 120 or 210) may identify whether a modulation order for wireless communication exceeds a first reference order. As an example, a first reference order may include a modulation order 7 corresponding to 128 QAM.

According to various embodiments of the disclosure, in case that a modulation order for wireless communication exceeds a first reference order (for example: "Yes" in operation 703), in operation 705, an electronic device (for example: a processor 120 or 210) may configure a voltage conversion mode of a DC-DC conversion module 242 to a PWM mode. According to an embodiment of the disclosure, in case that a modulation order for wireless communication exceeds a first reference order, a processor 210 may determine that noise occurring due to a PFM mode cause interference of wireless communication and that wireless communication performance (for example: a transmission rate) is thus degraded. In order to maintain wireless communication performance, a processor 210 may configure, to a PWM mode, a voltage conversion mode of a DC-DC conversion module 242 for supplying power to an internal circuit (for example: a communication processor 220) of an electronic device 101.

According to various embodiments of the disclosure, in case that a modulation order for wireless communication is equal to or smaller than a first reference order (for example: "No" in operation 703), in operation 707, an electronic device (for example: a processor 120 or 210) may configure a voltage conversion mode of a DC-DC conversion module 242 to a PFM mode. According to an embodiment of the disclosure, in case that a modulation order for wireless communication is equal to or smaller than a first reference order, a processor 210 may determine that wireless communication is insensitive to noise occurring due to a PFM mode. Accordingly, in order to reduce current consumption, a processor 210 may configure, to a PFM mode, a voltage conversion mode of a DC-DC conversion module 242 for supplying power to an internal circuit (for example: a communication processor 220) of an electronic device 101.

According to various embodiments of the disclosure, based on the result of a comparison between a modulation order for wireless communication and a first reference order, an electronic device 101 may configure, to a PWM mode or a PFM mode, a voltage conversion mode for supplying power to an internal circuit of an electronic device 101.

Figure 8:
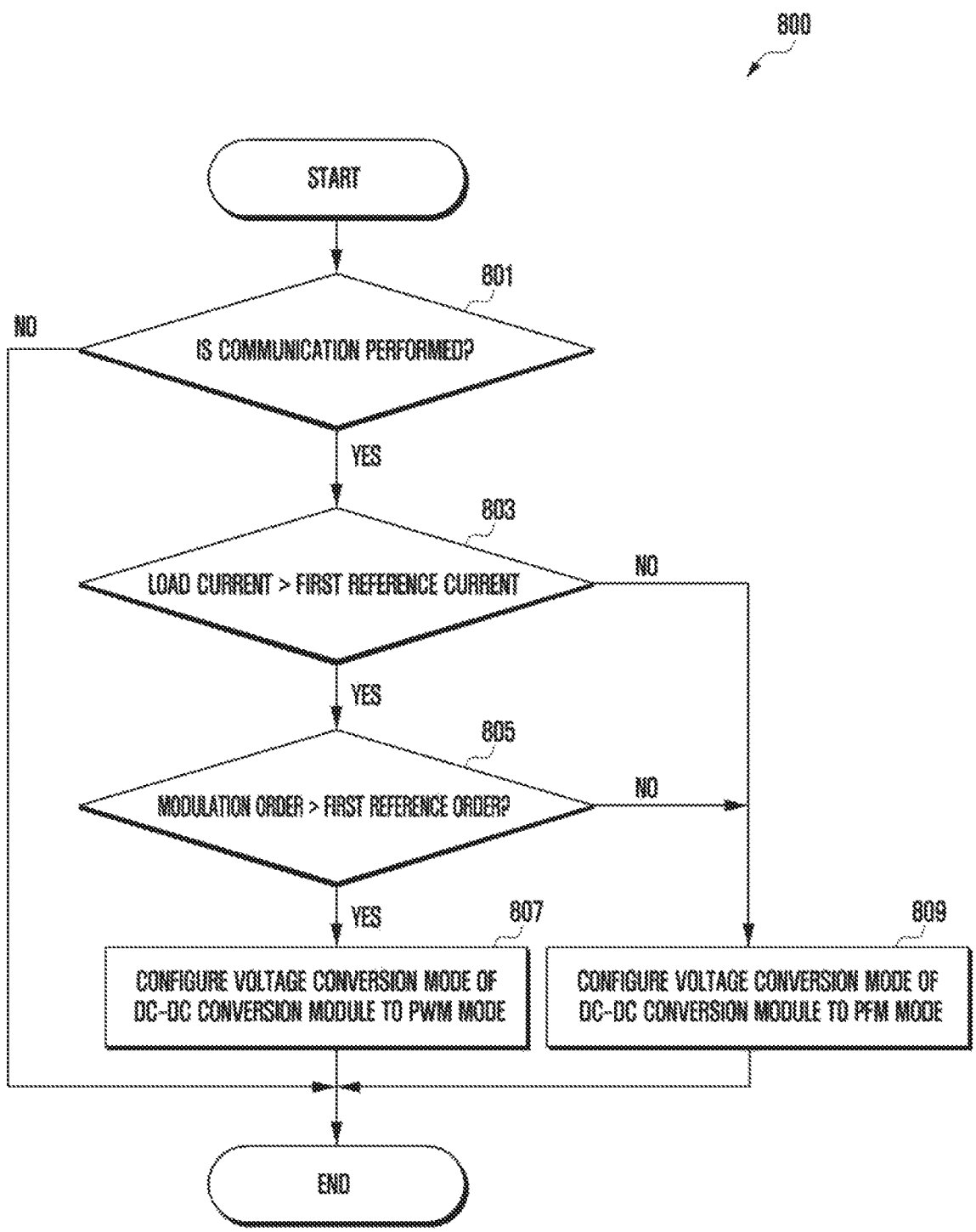
FIG. 8 is a flowchart for configuring, based on a modulation order and a load current, a voltage conversion mode in an electronic device according to an embodiment of the disclosure.

FIG. 8 is a flowchart 800 for configuring, based on a modulation order and a load current, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 8, according to various embodiments of the disclosure, in operation 801, an electronic device (for example: a processor 120 or a wireless communication module 192 of FIG. 1 or a communication processor 220 or a wireless communication module 230 of FIG. 2) may identify whether communication with an external electronic device is performed. As an example, communication with an external electronic device may include a series of operations of transmitting or receiving a signal through a wireless channel established between an electronic device 101 and the external electronic device.

According to various embodiments of the disclosure, in case that an electronic device (for example: a processor 120 or 210) does not perform communication with an external electronic device (for example: "No" in operation 801), a voltage conversion mode for power supply of an electronic device 101 may be maintained, although not illustrated. As an example, a voltage conversion mode for power supply of an electronic device 101 may be configured based on a load current.

According to various embodiments of the disclosure, in case that communication with an external electronic device (for example: "Yes" in operation 801) is performed, in operation 803, an electronic device (for example: a processor 120 or 210) may identify whether a load current related to a power source of the electronic device 101 exceeds a first reference current.

According to various embodiments of the disclosure, in case that a load current exceeds a first reference current (for example: "Yes" in operation 803), in operation 805, an electronic device (for example: a processor 120 or 210) may identify whether a modulation order for wireless communication with an external electronic device exceeds a first reference order. As an example, a first reference order may be configured to modulation order 7 corresponding to 128 QAM.

According to various embodiments of the disclosure, in case that a modulation order for wireless communication exceeds a first reference order (for example: "Yes" in operation 805), in operation 807, an electronic device (for example: a processor 120 or 210) may configure a voltage conversion mode of a DC-DC conversion module 242 to a PWM mode. According to an embodiment of the disclosure, in a PFM mode, the supply of a relatively high load current may be limited, and interference in wireless communication may be affected. Accordingly, in case that a load current exceeds a first reference current and a modulation order for wireless communication exceeds a first reference order, a processor 210 may configure a voltage conversion mode of a DC-DC conversion module 242 to a PWM mode.

According to various embodiments of the disclosure, in case that a load current is equal to or smaller than a first reference current (for example: "No" in operation 803) or a modulation order for wireless communication is equal to or smaller than a first reference order (for example: "No" in operation 805), in operation 811, an electronic device (for example: a processor 120 or 210) may configure a voltage conversion mode of a DC-DC conversion module 242 to a PFM mode.

Figure 9:
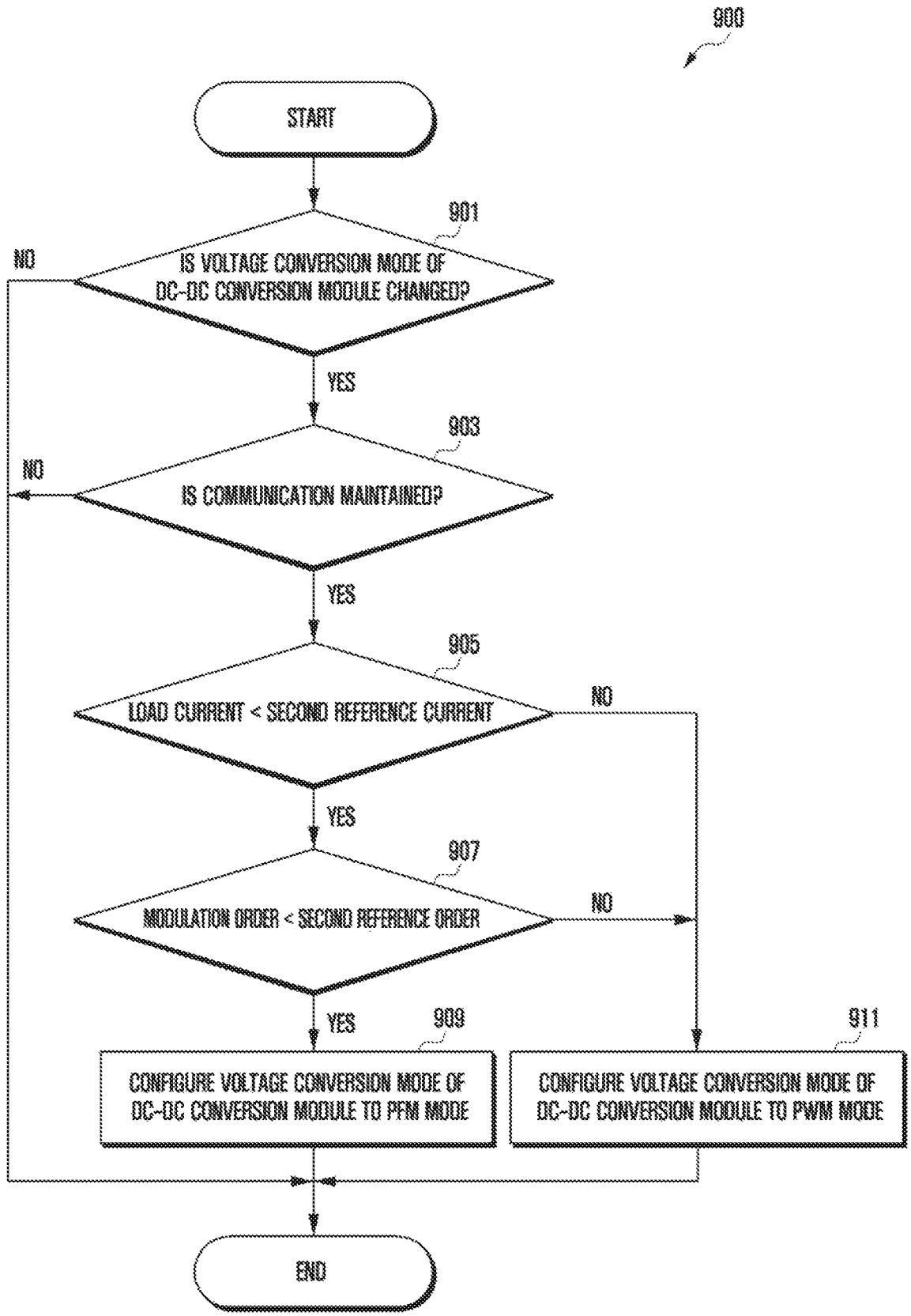
FIG. 9 is a flowchart for changing, based on a modulation order and a load current, a voltage conversion mode in an electronic device according to an embodiment of the disclosure.

FIG. 9 is a flowchart 900 for changing, based on a modulation order and a load current, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 9, according to various embodiments of the disclosure, in operation 901, an electronic device (for example: a processor 120 or a power management module 188 of FIG. 1 or a processor 210 or a power management module 240 of FIG. 2) may identify whether a voltage conversion mode of a DC-DC conversion module 242 is changed for communication of the electronic device. According to an embodiment of the disclosure, a voltage conversion mode of a DC-DC conversion module 242 may be changed based on a modulation order, as in operation 701 to operation 707 of FIG. 7. According to an embodiment of the disclosure, a voltage conversion mode of a DC-DC conversion module 242 may be changed based on a load current and a modulation order, as in operation 801 to operation 809 of FIG. 8.

According to various embodiments of the disclosure, in case that a voltage conversion mode of a DC-DC conversion module 242 is changed (for example: "Yes" in operation 901), in operation 903, an electronic device (for example: a processor 120, a wireless communication module 192, a communication processor 220, or a wireless communication module 230) may identify whether communication with an external electronic device is maintained. According to an embodiment of the disclosure, a processor 210 may identify whether a wireless channel with an external electronic device is maintained through a wireless communication module 230.

According to various embodiments of the disclosure, in case that a voltage conversion mode of a DC-DC conversion module 242 is maintained (for example: "No" in operation 901) or in case that communication with an external electronic device is not performed (for example: "No" in operation 903), an electronic device (for example: a processor 120 or 210) may maintain a voltage conversion mode of an electronic device 101. As an example, a voltage conversion mode of an electronic device 101 may be configured based on a load current.

According to various embodiments of the disclosure, in case that communication with an external electronic device is maintained (for example: "Yes" in operation 903), in operation 905, an electronic device (for example: processor 120 or 210) may identify whether a load current related to a power source of an electronic device 101 is smaller than a second reference current. As an example, a second reference current may be configured as a value different from a first reference current of FIG. 8.

According to various embodiments of the disclosure, in case that a load current is smaller than a second reference current (for example: "Yes" in operation 905), in operation 907, an electronic device (for example: a processor 120 or 210) may identify whether a modulation order for wireless communication with an external electronic device is smaller than a second reference order. As an example, a second reference order may be configured to modulation order 5 corresponding to 32QAM differently from a first reference order of FIG. 8.

According to various embodiments of the disclosure, in case that a modulation order for wireless communication is smaller than a second reference order (for example: "Yes" in operation 907), in operation 909, an electronic device (for example: processor 120 or 210) may configure a voltage conversion mode of a DC-DC conversion module 242 to a PFM mode. According to an embodiment of the disclosure, in case that a load current is smaller than a second reference current and a modulation order for wireless communication is smaller than a second reference order, a processor 210 may configure a voltage conversion mode of a DC-DC conversion module 242 to a PFM mode. As an example, in case that a voltage conversion mode is changed to a PWM method in operation 901, a DC-DC conversion module 242 may change a voltage conversion mode to a PFM mode in operation 909.

According to various embodiments of the disclosure, in case that a load current is equal to or larger than a second reference current (for example: "No" in operation 905), or a modulation order is equal to or larger than a second reference order (for example: "No" in operation 907), in operation 911, an electronic device (for example: a processor 120 or 210) may configure a voltage conversion mode of a DC-DC conversion module 242 to a PWM mode.

According to various embodiments of the disclosure, an electronic device 101 may adaptively configure at least one among a reference current related to a load current or a reference order related to a modulation order, which determines whether to change a voltage conversion mode, so as to prevent frequent changes in a voltage conversion mode of a DC-DC conversion module 242. According to an embodiment of the disclosure, a second reference current of FIG. 9 may be configured to be the same as a first reference current of FIG. 8, and a second reference order of FIG. 9 may be configured differently from a second reference order of FIG. 8. According to an embodiment of the disclosure, a second reference current of FIG. 9 may be configured differently from a first reference current of FIG. 8, and a second reference order of FIG. 9 may be configured to be the same as a second reference order of FIG. 8.

According to various embodiments of the disclosure, in case that a voltage conversion mode is changed to prevent frequent changes in a voltage conversion mode of a DC-DC conversion module 242, an electronic device 101 may maintain a changed voltage conversion mode for a predetermined duration of time. According to an embodiment of the disclosure, a reference value for determining whether to change a voltage conversion mode may be maintained to be the same as a reference value of FIG. 8. As an example, a reference value for determining whether to change a voltage conversion mode may include at least one among a reference current related to a load current or a reference order related to a modulation order.

According to various embodiments of the disclosure, an electronic device 101 may identify a modulation order for wireless communication, based on a CQI index or MCS index. According to an embodiment of the disclosure, a CQI index is identification information for indicating a CQI value, and a modulation mode supported by a CQI index may be configured as shown in Table 2 defined in the standard document TS 36.213 or the standard document TS 38.214. A processor 120 or 210 may configure a voltage conversion mode of a DC-DC conversion module 242, based on a modulation mode related to a CQI index.

TABLE 2

| CQI index | Modulation | Code rate x 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |

TABLE 2-continued

| CQI index | Modulation | Code rate x 1024 | Efficiency |
|---|---|---|---|
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 17 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Referring to Table 2, CQI indexes, from 1 to 11, may support a modulation mode of 64 QAM or smaller, and CQI indexes, from 12 to 15, may support a modulation mode of 256 QAM. As an example, in case that a CQI index is 11 or smaller, a processor 120 or 210 may determine that wireless communication is insensitive to an influence of interference due to a PFM mode. Accordingly, in case that a CQI index is 11 or smaller, a processor 120 or 210 may configure a voltage conversion mode of a DC-DC conversion module 242 to a PFM mode. As an example, in case that a CQI index exceeds 11, a processor 120 or 210 may determine that wireless communication is sensitive to an influence of interference due to a PFM mode. Accordingly, in case that a CQI index exceeds 11, a processor 120 or 210 may configure a voltage conversion mode of a DC-DC conversion module 242 to a PWM mode.

According to an embodiment of the disclosure, an MCS index is identification information for indicating an MCS value, and a modulation order supported by an MCS index may be configured as shown in Table 3 defined in the standard document TS 36.213 or the standard document TS 38.214. A processor 120 or 210 may configure a voltage conversion mode of a DC-DC conversion module 242, based on a modulation order related to an MCS index.

TABLE 3

| MCS index | Modulation order | Target code rate Rx [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |

Referring to table. 3, MCS indexes, from 0 to 19, may support a modulation mode of 6 or smaller, and MCS indexes, from 20 to 27, may support a modulation mode of 8. As an example, in case that an MCS index is 19 or smaller, a processor 120 or 210 may determine that wireless communication is insensitive to an influence of interference due to a PFM mode. Accordingly, in case that an MCS index is 19 or smaller, a processor 120 or 210 may configure a voltage conversion mode of a DC-DC conversion module 242 to a PFM mode. As an example, in case that an MCS index is 20 or larger, a processor 120 or 210 may determine that wireless communication is sensitive to an influence of interference due to a PFM mode. Accordingly, in case that an MCS index is 20 or larger, a processor 120 or 210 may configure a voltage conversion mode of a DC-DC conversion module 242 to a PWM mode. As an example, wireless communication may be robust to interference, based on a code rate (for example: a channel code level). Accordingly, a processor 120 or 210 may configure a voltage conversion mode of a DC-DC conversion module 242, based on a combination of an MCS index and a target code rate.

According to an embodiment of the disclosure, an MCS index is identification information for indicating an MCS value, and a modulation order supported by an MCS index related to a downlink may be configured, as shown in Table 4 defined in the standard document TS 36.213. A processor 120 or 210 may configure a voltage conversion mode of a DC-DC conversion module 242, based on a modulation order related to an MCS index.

TABLE 4

| MCS index | modulation order Qm | Modulation order Q'm | TBS index |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 11 |
| 6 | 4 | 6 | 13 |
| 7 | 4 | 8 | 15 |
| 8 | 6 | 8 | 16 |
| 9 | 6 | 8 | 18 |
| 10 | 6 | 8 | 20 |
| 11 | 6 | 8 | 21 |
| 12 | 6 | 8 | 92 |
| 13 | 6 | 8 | 23 |
| 14 | 6 | 8 | 24 |
| 15 | 8 | 8 | 25 |
| 16 | 8 | 8 | 27 |
| 17 | 8 | 8 | 28 |
| 18 | 8 | 8 | 29 |
| 19 | 8 | 8 | 30 |
| 20 | 8 | 8 | 31 |
| 21 | 8 | 8 | 32 |
| 22 | 8 | 8 | 33/33A/33B |
| 23 | 10 | 10 | 34A |
| 24 | 10 | 10 | 35 |
| 25 | 10 | 10 | 36 |
| 26 | 10 | 10 | 37A/37 |
| 27 | 2 | 9 | reserved |
| 28 | 4 | 4 | |
| 29 | 6 | 6 | |
| 30 | 8 | 8 | |
| 31 | 10 | 10 | |

Referring to table. 4, MCS indexes, from 0 to 14 and from 27 to 29, may support a modulation mode of 6 or smaller, and MCS indexes, from 15 to 26 and from 30 to 31, may support a modulation mode of 8 or larger. As an example, in case that an MCS index is 14 or smaller, a processor 120 or 210 may determine that wireless communication is insensitive to an influence of interference due to a PFM mode.

Accordingly, in case that an MCS index is 14 or smaller, a processor 120 or 210 may configure a voltage conversion mode of a DC-DC conversion module 242 to a PFM mode. As an example, in case that an MCS index falls within the range of 15 to 26, a processor 120 or 210 may determine that wireless communication is sensitive to an influence of interference due to a PFM mode. Accordingly, in case that an MCS index falls within the range of 15 to 26, a processor 120 or 210 may configure a voltage conversion mode of a DC-DC conversion module 242 to a PWM mode.

Figure 10A:
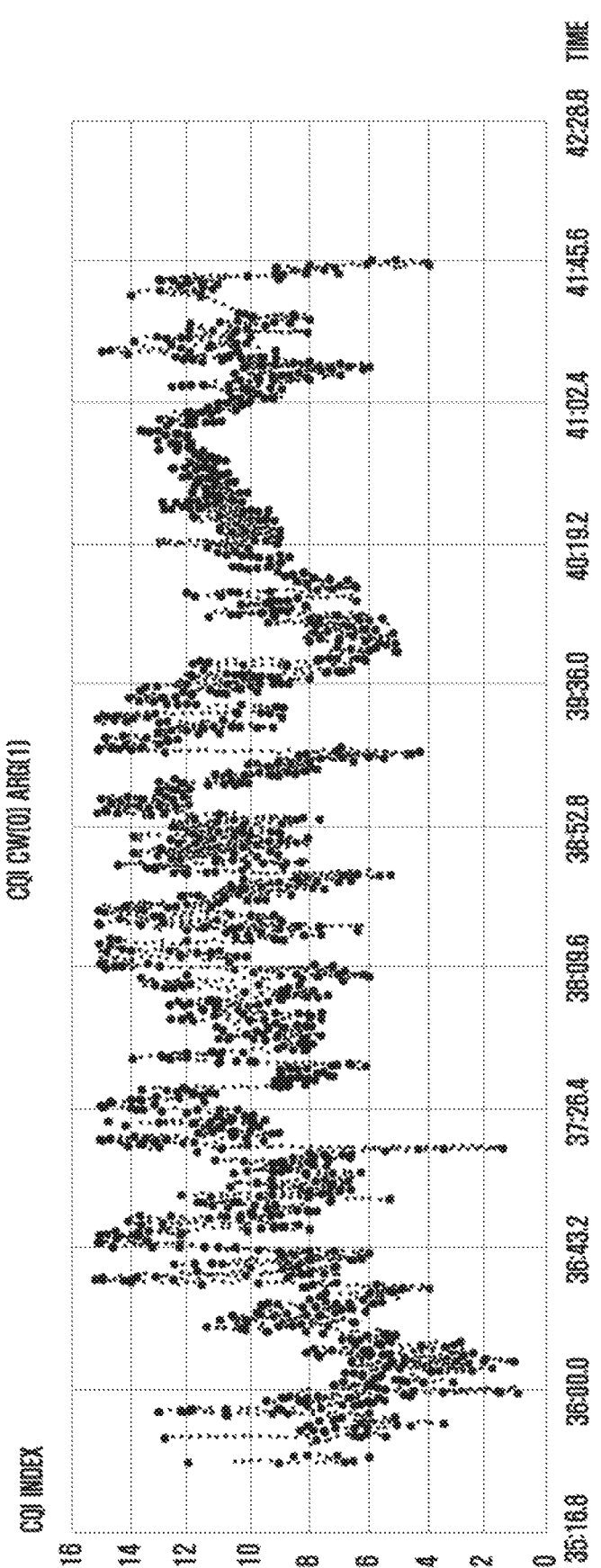
FIGS. 10A and 10B are a graph illustrating a relation between a channel quality indicator (CQI) index or a modulation coding scheme (MCS) index and a modulation order according to various embodiments of the disclosure.
Figure 10B:
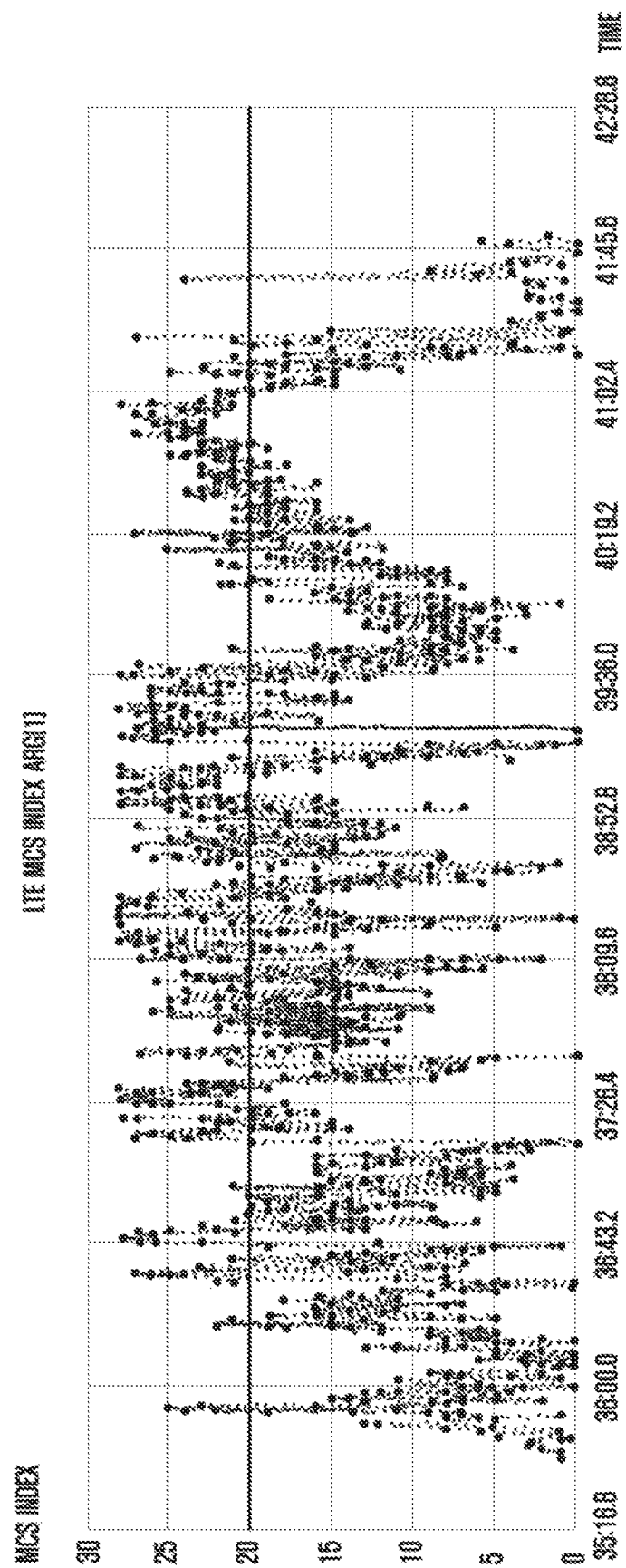

FIGS. 10A and 10B are a graph illustrating a relation between a CQI index or an MCS index and a modulation order according to various embodiments of the disclosure.

Referring to FIG. 10A, a horizontal axis may indicate a time and a vertical axis may indicate a CQI index. Referring to FIG. 10B, a horizontal axis may indicate a time and a vertical axis may indicate an MCS index.

According to various embodiments of the disclosure, in case that an electronic device 101 provides a long term evolution (LTE) communication service, a CQI index of 11 or smaller may be maintained for a relatively long time, as in FIG. 10A. According to an embodiment of the disclosure, in case that a CQI index is 11 or less, an electronic device 101 may configure a voltage conversion mode of a DC-DC conversion module 242 to a PFM mode. For example, an electronic device 101 may reduce a current consumed by voltage conversion because a time during which a voltage conversion mode is configured to a PFM mode is relatively longer than a time during which a voltage conversion mode is configured to a PWM mode in an LTE communication service.

According to various embodiments of the disclosure, in case that an electronic device 101 provides a long term evolution (LTE) communication service, an MCS index of 19 or smaller may be maintained for a relatively long time, as in FIG. 10B. According to an embodiment of the disclosure, in case that an MCS index is 19 or less, an electronic device 101 may configure a voltage conversion mode of a DC-DC conversion module 242 to a PFM mode. For example, an electronic device 101 may reduce a current consumed by voltage conversion because a time during which a voltage conversion mode is configured to a PFM mode is relatively longer than a time during which a voltage conversion mode is configured to a PWM mode in an LTE communication service.

Figure 11:
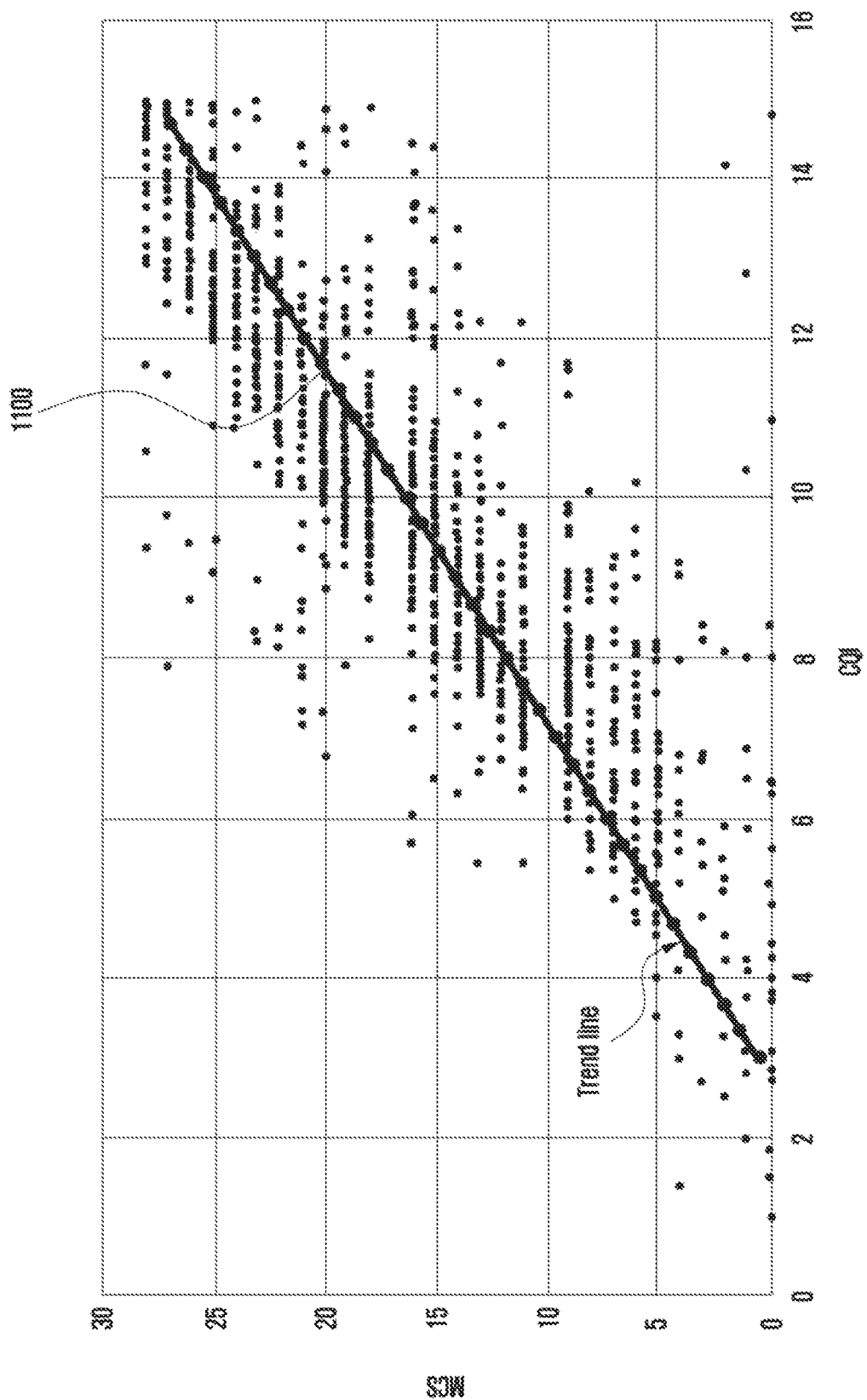
FIG. 11 is a graph illustrating a correlation between a CQI and an MCS according to an embodiment of the disclosure.

FIG. 11 is a graph illustrating a correlation between a CQI and an MCS according to an embodiment of the disclosure. In the description below, in FIG. 11, a horizontal axis may indicate a CQI (or a CQI index) and a vertical axis may indicate an MCS (or an MCS index).

Referring to FIG. 11, according to various embodiments of the disclosure, a CQI index and an MCS index may include similar tendencies (1100). For example, a CQI index may increase in proportion to an MCS index. According to various embodiments of the disclosure, a CQI index may include a tendency different from that of an MCS index, as shown in FIG. 11. As an example, in case that a required data transmission rate is low although a CQI is high, an MCS index may be configured to be relatively low although a CQI index is relatively high.

Figure 12:
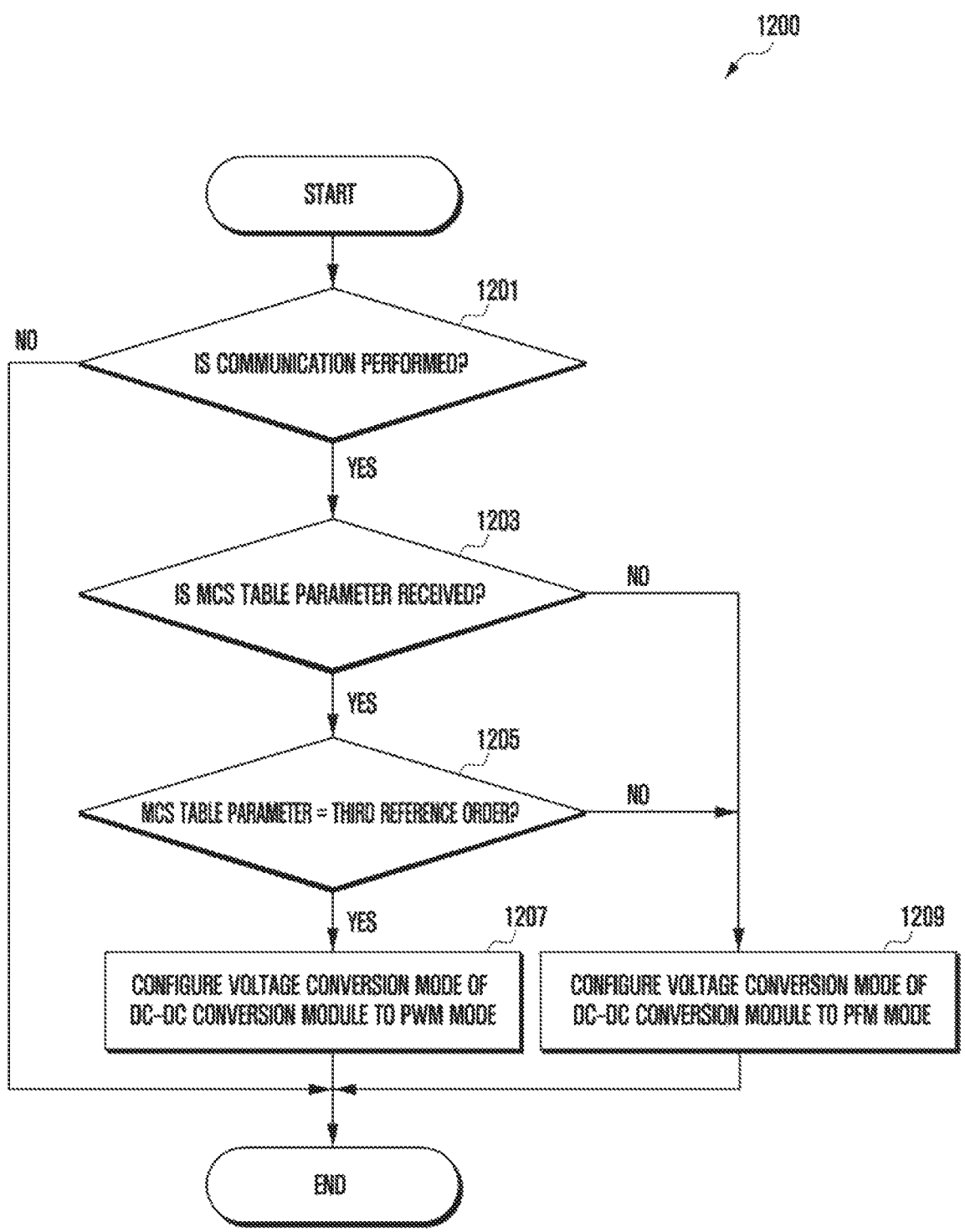
FIG. 12 is a flowchart for configuring, based on an MCS-table parameter, a voltage conversion mode according to an embodiment of the disclosure.

FIG. 12 is a flowchart 1200 for configuring, based on an MCS-table parameter, a voltage conversion mode according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG.

Referring to FIG. 12, according to various embodiments of the disclosure, an electronic device (for example: a processor 120 or a wireless communication module 192 of FIG. 1 or a communication processor 220 or a wireless communication module 230 of FIG. 2) may identify whether communication with an external electronic device is performed using a wireless resource in operation 1201. According to an embodiment of the disclosure, a processor 120 may access an external electronic device (for example: a base station) through a wireless communication module 192.

According to various embodiments of the disclosure, in case that wireless communication with an external electronic device is not performed (for example: "No" in operation 1201), an electronic device (for example: a processor 120 or 210) may maintain a voltage conversion mode configured based on a load current. According to an embodiment of the disclosure, in case that a load current is changed, a processor 210 may change a voltage conversion mode, based on a changed load current.

According to various embodiments of the disclosure, in case that communication with an external electronic device is not performed (for example: "No" in operation 1201), an electronic device (for example: a processor 120 or 210) may maintain a voltage conversion mode configured based on a load current, although not illustrated.

According to various embodiments of the disclosure, in case that communication with an external electronic device is performed (for example: "Yes" in operation 1201), in operation 1203, an electronic device (for example: a processor 120 or 210) may identify whether an MCS-table parameter is received from an external electronic device (for example: a base station). According to an embodiment of the disclosure, a processor 210 may receive an MCS-table parameter through RRC signaling. For example, an MCS-table parameter may be included in physical downlink shared channel (PDSCH) composition information (for example: PDSCH-config IE) of RRC signaling.

According to various embodiments of the disclosure, in case that an MCS-table parameter is received (for example: "Yes" in operation 1203), in operation 1205, an electronic device (for example: a processor 120 or 210) may identify whether an MCS-table parameter is configured to a third reference order. According to an embodiment of the disclosure, a processor 210 may identify whether a maximum value of a modulation order for a PDSCH is configured to 8 (corresponding to 256 QAM), based on an MCS-table parameter configured as in Table 5 according to the standard documents TS 38.331 and TS 38.214. For example, a third reference order may be configured to 8.

TABLE 5

| MCS-table parameter value | Maximum value of modulation order |
|---|---|
| QAM64lowSE | 64QAM |
| QAM256 | 256QAM |
| absent | 64QAM |

According to various embodiments of the disclosure, in case that an MCS-table parameter is configured to a third reference order (for example: "Yes" in operation 1205), in operation 1207, an electronic device (for example: a processor 120 or 210) may configure a voltage conversion mode of a DC-DC conversion module 242 to a PWM mode.

According to an embodiment of the disclosure, in case that a modulation order for a PDSCH is configured to a third reference order (for example: 8), a processor 210 may determine that wireless communication is sensitive to an influence of interference by a PFM mode. A processor 210 may configure a voltage conversion mode of a DC-DC conversion module 242 to a PWM mode so as to maintain wireless communication performance.

According to various embodiments of the disclosure, in case that an MCS-table parameter is not received from an external electronic device (for example: "No" in operation 1203) or an MCS-table parameter is not configured to a third reference order (for example, "No" in operation 1205), in operation 1209, an electronic device (for example: a processor 120 or 210) may configure a voltage conversion mode of a DC-DC conversion module 242 to a PFM mode. According to an embodiment of the disclosure, in case that RRC signaling configured as "qam64LowSE" is received from an external electronic device, a processor 210 may determine that a modulation order for a PDSCH is configured to 6 (for example: corresponding to 64 QAM). A processor 210 may determine that wireless communication based on a corresponding modulation order is insensitive to noise occurring due to a PFM mode, and may thus configure a voltage conversion mode of a DC-DC conversion module 242 to a PFM mode.

According to various embodiments of the disclosure, an electronic device 101 may receive an MCS-table parameter which is a variable related to semi-persistent transmission from a network (for example: a base station). According to an embodiment of the disclosure, an electronic device 101 may identify a variable related to semi-permanent transmission through SPS composition information (semi-persistent scheduling-configuration information element) of RRC signaling. As an example, a variable related to semi-persistent transmission may include at least one among periodicity, nrof_hybrid-automatic-repeat-request-Processes (nrof_HARQ-Processes), or n1_physical uplink control channel-AN or MCS-table parameters (n1_PUCCH-AN or MCS-table parameters). According to an embodiment of the disclosure, in case that RRC signaling configured as "qam64LowSE" is received from an external electronic device, a processor 120 or 210 may configure a voltage conversion mode of a DC-DC conversion module 242 to a PFM mode.

Figure 13:
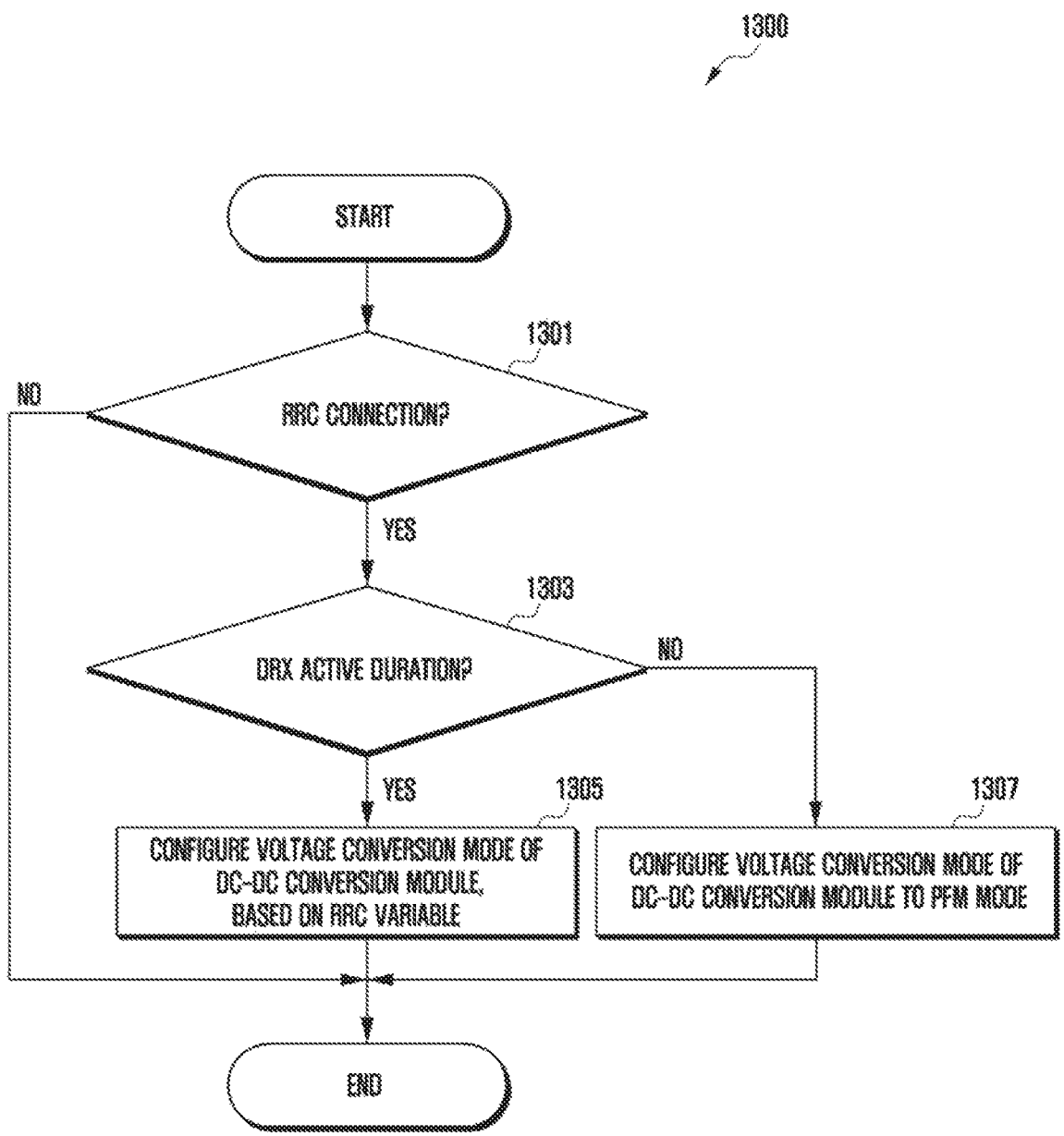
FIG. 13 is a flowchart for configuring, based on a discontinuous reception (DRX) operation state, a voltage conversion mode in an electronic device according to an embodiment of the disclosure.

FIG. 13 is a flowchart 1300 for configuring, based on a DRX operation state, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 13, according to various embodiments of the disclosure, an electronic device (for example: a processor 120 or a wireless communication module 192 of FIG. 1 or a communication processor 220 or a wireless communication module 230 of FIG. 2) may identify whether RRC connection with an external electronic device (for example: a base station) is maintained in operation 1301.

According to various embodiments of the disclosure, in case that RRC connection with an external electronic device is released (for example: "No" in operation 1301), an electronic device (for example: a processor 120 or 210) may maintain a voltage conversion mode of an electronic device 101.

According to various embodiments of the disclosure, in case that RRC connection with an external electronic device is maintained (for example: "Yes" in operation 1301), in operation 1303, an electronic device (for example: a processor 120 or 210) may identify whether a current time is included in a DRX active duration (DRX on duration). As an example, a DRX active duration may include at least a partial period in which an electronic device 101 monitors a physical downlink control channel (PDCCH).

According to various embodiments of the disclosure, in case that a current time is included in a DRX active duration (for example: "Yes" in operation 1303), in operation 1305, an electronic device (for example: a processor 120 or 210) may configure a voltage conversion mode of a DC-DC conversion module 242, based on an RRC variable. According to an embodiment of the disclosure, a processor 210 may configure a voltage conversion mode of a DC-DC conversion module 242, based on an MCS-table parameter which is a variable of RRC signaling, as in operation 1201 to operation 1209 of FIG. 12. According to an embodiment of the disclosure, a processor 210 may determine whether to configure URLLC, based on MCS-C-RNTI which is a variable of RRC signaling. A processor 210 may configure a voltage conversion mode of a DC-DC conversion module 242, based on whether URLLC is configured.

According to various embodiments of the disclosure, in case that a current time does not fall within a DRX active duration (for example: "No" in operation 1303), in operation 1307, an electronic device (for example: a processor 120) may configure a voltage conversion mode of a DC-DC conversion module to a PFM mode. According to an embodiment of the disclosure, in case of a DRX inactive duration, wireless communication is not performed, and thus, a processor 210 may configure a voltage conversion mode of a DC-DC conversion module 242 to a PFM mode so as to reduce power consumption.

Figure 14:
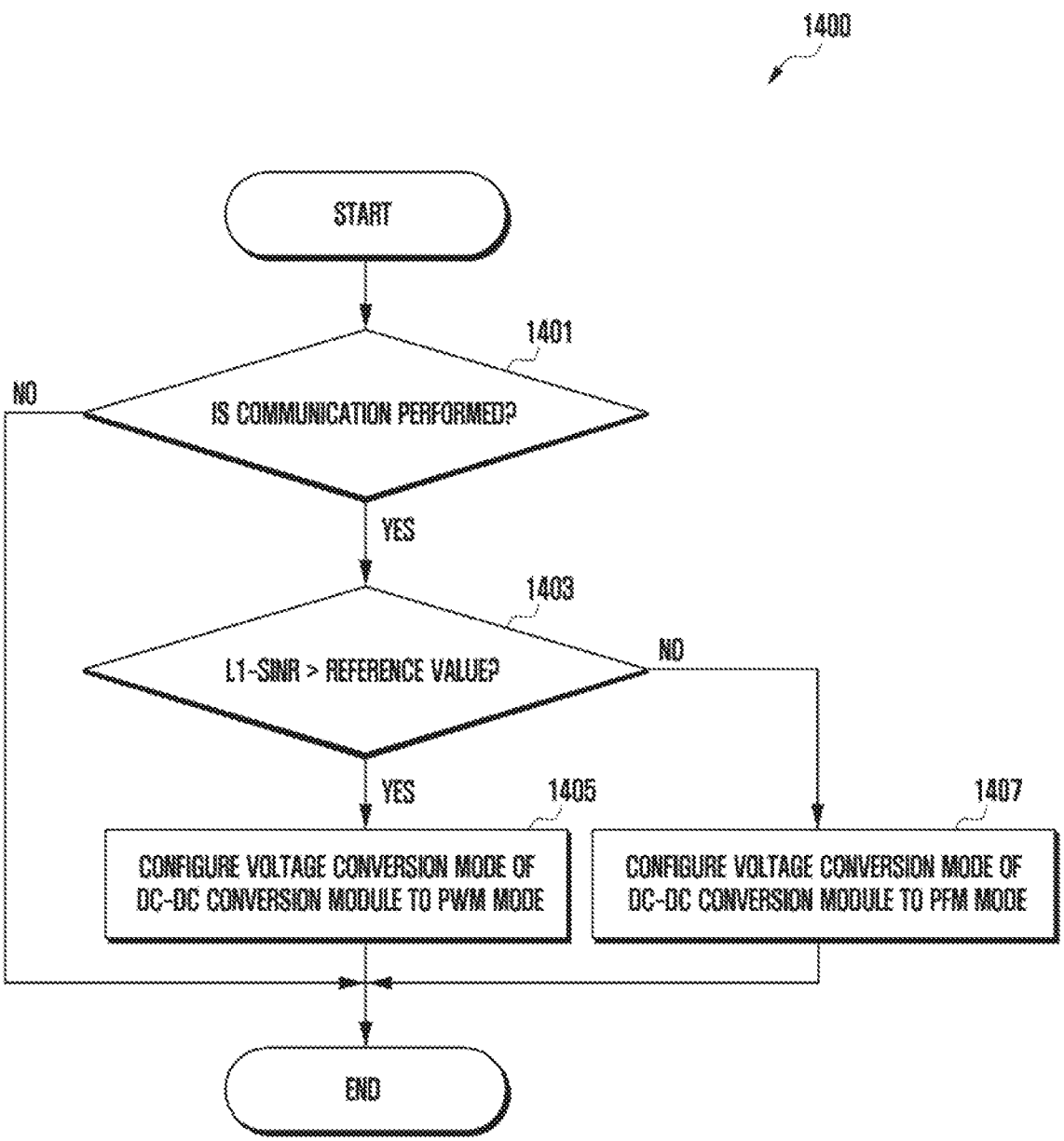
FIG. 14 is a flowchart for configuring, based on an L1-SINR, a voltage conversion mode in an electronic device according to an embodiment of the disclosure.

FIG. 14 is a flowchart 1400 for configuring, based on an L1-SINR, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 14, according to various embodiments of the disclosure, an electronic device (for example: a processor 120 or a wireless communication module 192 of FIG. 1 or a communication processor 220 or a wireless communication module 230 of FIG. 2) may identify whether communication with an external electronic device is performed through a wireless resource in operation 1401. According to an embodiment of the disclosure, a processor 210 may identify whether data is transmitted or received through a wireless channel with an external electronic device by using a wireless communication module 230.

According to various embodiments of the disclosure, in case that communication with an external electronic device is not performed (for example: "No" in operation 1401), an electronic device (for example: a processor 120 or 210) may maintain a voltage conversion mode of an electronic device 101, although not illustrated.

According to various embodiments of the disclosure, in case that communication with an external electronic device (for example: "Yes" in operation 1401) is performed, in operation 1403, an electronic device (for example: a processor 120 or 210) may identify whether an SINR of a physical layer (L1-SINR) exceeds a reference value. As an example, an SINR of a physical layer may be calculated based on at least one signal among an SS/PBCH block (SSB), NZP-CSI-RS, or ZP-CSI-RS of a physical layer L1.

According to various embodiments of the disclosure, in case that an SINR of a physical layer (L1-SINR) exceeds a reference value (for example: "Yes" in operation 1403), in operation 1405, an electronic device (for example: processor 120 or 210) may configure a voltage conversion mode of a DC-DC conversion module 242 to a PWM mode. According to an embodiment of the disclosure, in case that an SINR of a physical layer (L1-SINR) exceeds a reference value, data may be transmitted at a high speed, and thus a processor 210 may determine sensitivity to an influence of interference due to a PFM mode. A processor 210 may configure a voltage conversion mode of a DC-DC conversion module 242 to a PWM mode so as to maintain wireless communication performance.

According to various embodiments of the disclosure, in case that an SINR of a physical layer (L1-SINR) is equal to or smaller than a reference value (for example: "No" in operation 1403), in operation 1407, an electronic device (for example: a processor 120 or 210) may configure a voltage conversion mode of a DC-DC conversion module 242 to a PFM mode. According to an embodiment of the disclosure, in case that an SINR of a physical layer (L1-SINR) is equal to or smaller than a reference value, high-speed data transmission is limited, and thus a processor 210 may determine insensitivity to an influence of interference due to a PFM mode. A processor 210 may configure a voltage conversion mode of a DC-DC conversion module 242 to a PFM mode so as to reduce current consumption.

According to various embodiments of the disclosure, an electronic device 101 may configure, based on the result of a comparison between a reference value and an interference part of an SINR of a physical layer, a voltage conversion mode of a DC-DC conversion module 242.

Figure 15:
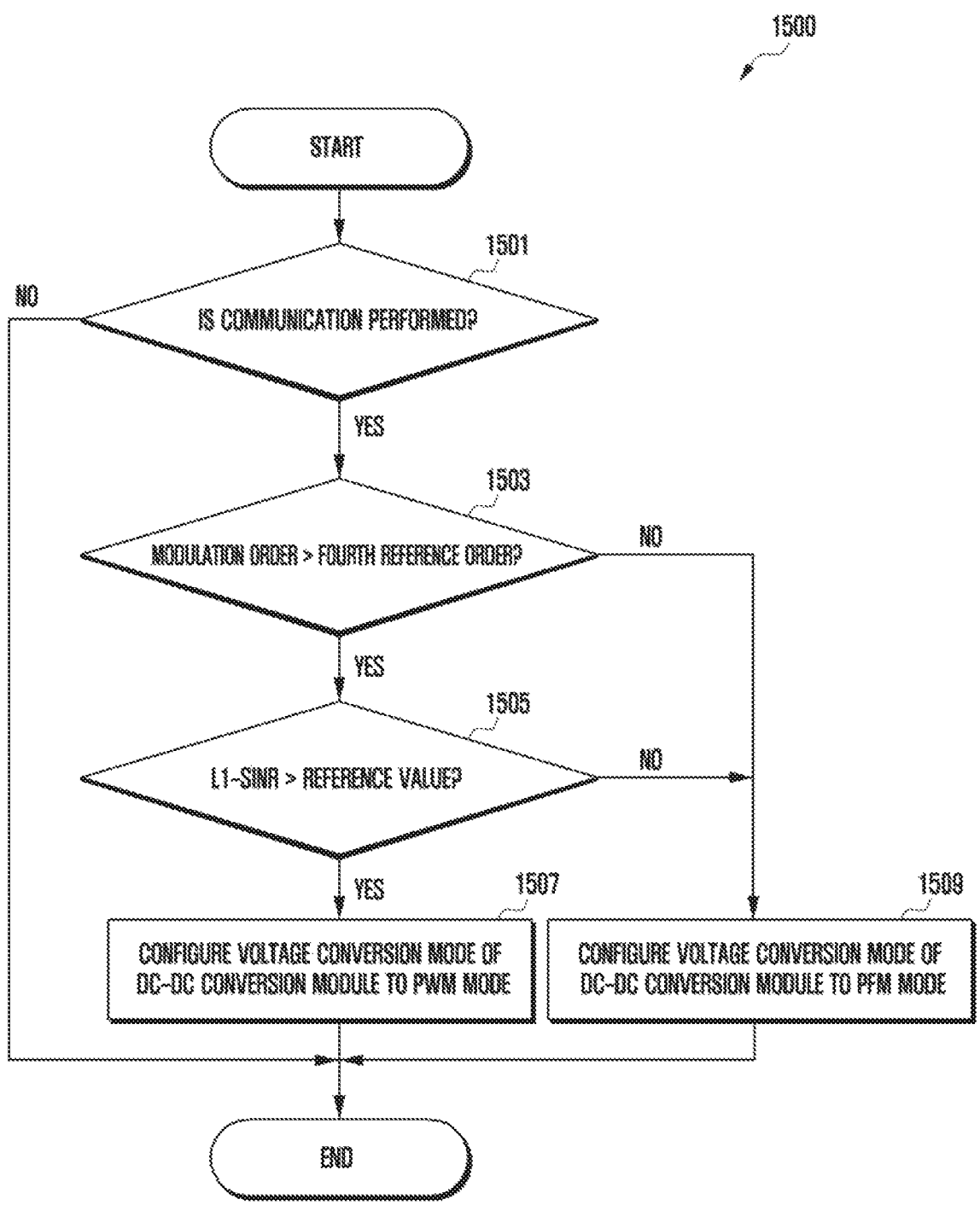
FIG. 15 is a flowchart for configuring, based on a modulation order and an L1-SINR, a voltage conversion mode in an electronic device according to an embodiment of the disclosure.

FIG. 15 is a flowchart 1500 for configuring, based on a modulation order and an L1-SINR, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 15, according to various embodiments of the disclosure, an electronic device (for example: a processor 120 or a wireless communication module 192 of FIG. 1 or a communication processor 220 or a wireless communication module 230 of FIG. 2) may identify whether wireless communication with an external electronic device is performed in operation 1501. According to an embodiment of the disclosure, a processor 210 may identify whether data is transmitted or received to or from an external electronic device through a wireless communication module 230.

According to various embodiments of the disclosure, in case that wireless communication with an external electronic device is not performed (for example: "No" in operation 1501), an electronic device (for example: a processor 120 or 210) may maintain a voltage conversion mode of an electronic device 101 configure based on a load current.

According to various embodiments of the disclosure, in case that wireless communication with an external electronic device is performed (for example: "Yes" in operation 1501), in operation 1503, an electronic device (for example: processor 120 or 210) may identify whether a modulation order for wireless communication with an external electronic device exceeds a fourth reference order. As an example, a fourth reference order may include modulation order 7 corresponding to 128 QAM.

According to various embodiments of the disclosure, in case that a modulation order for wireless communication with an external electronic device exceeds a fourth reference order (for example: "Yes" in operation 1503), in operation 1505, an electronic device (for example: a processor 120 or 210) may identify whether an SINR of a physical layer (L1-SINR) exceeds a reference value.

According to various embodiments of the disclosure, in case that an SINR of a physical layer (L1-SINR) exceeds a reference value (for example: "Yes" in operation 1505), in operation 1507, an electronic device (for example: a processor 120 or 210) may configure a voltage conversion mode of a DC-DC conversion module 242 to a PWM mode. According to an embodiment of the disclosure, in case that a modulation order for wireless communication exceeds a fourth reference order and an SINR of a physical layer (L1-SINR) exceeds a reference value, a processor 210 may determine sensitivity to an influence of interference due to a PFM mode. Accordingly, a processor 210 may configure a voltage conversion mode of a DC-DC conversion module 242 to a PWM mode.

According to various embodiments of the disclosure, in case that a modulation order for wireless communication is equal to or smaller than a fourth reference order (for example: "No" in operation 1503) or an SINR of a physical layer (L1-SINR) is equal to or smaller than a reference value (for example: "No" in operation 1505), in operation 1509, an electronic device (for example: a processor 120 or 210) may configure a voltage conversion mode of a DC-DC conversion module 242 to a PFM mode. According to an embodiment of the disclosure, in case that a modulation order for wireless communication is equal to or smaller than a fourth reference order or an SINR of a physical layer (L1-SINR) is equal to or smaller than a reference value, a processor 210 may determine insensitivity to an influence of interference due to a PFM mode. Accordingly, a processor 210 may configure a PFM mode having relatively good voltage conversion efficiency as a voltage conversion mode of a DC-DC conversion module 242.

Figure 16:
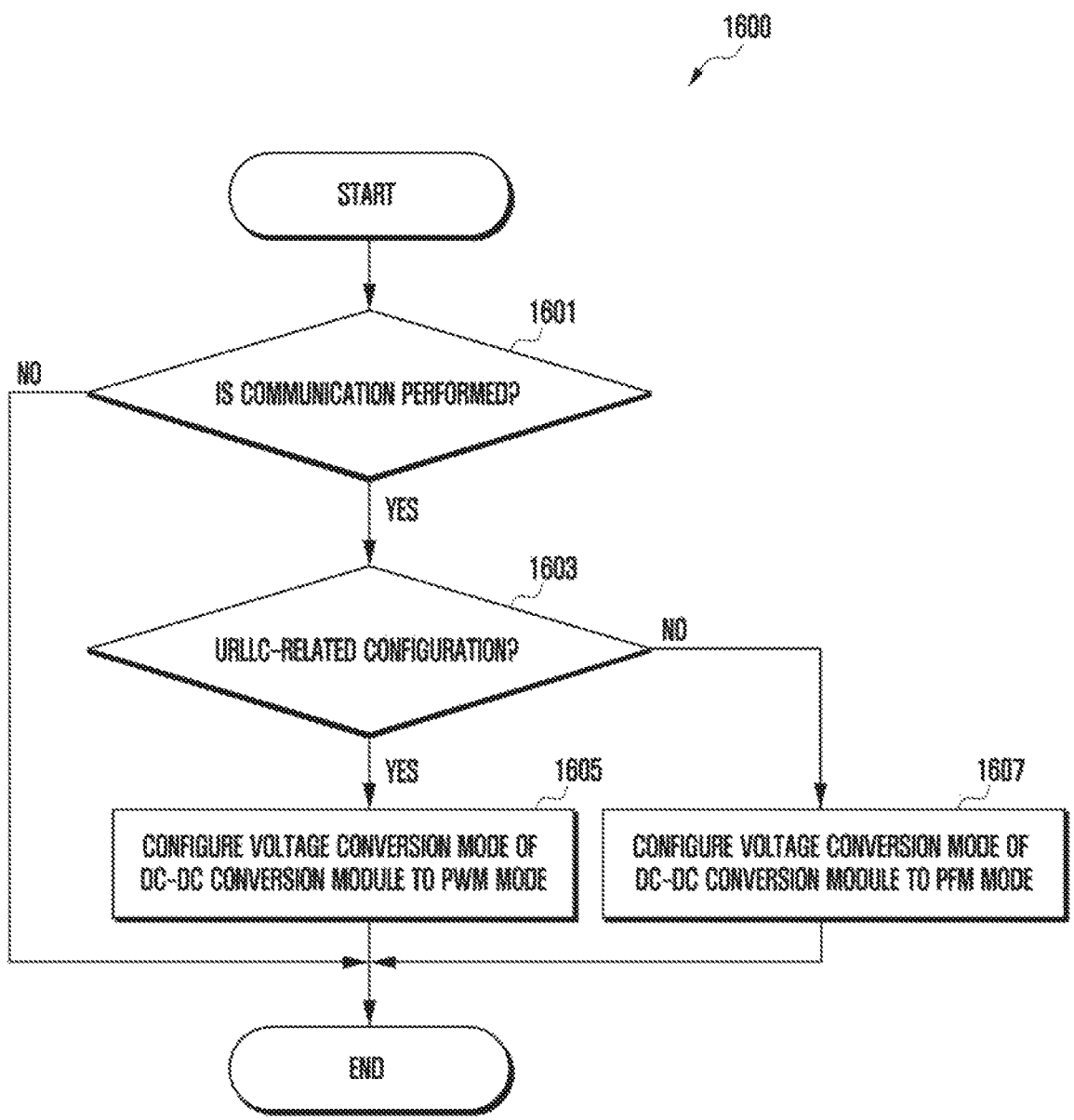
FIG. 16 is a flowchart for configuring, based on a communication state, a voltage conversion mode in an electronic device according to an embodiment of the disclosure.

FIG. 16 is a flowchart 1600 for configuring, based on a communication state, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 16, according to various embodiments of the disclosure, an electronic device (for example: a processor 120 or a wireless communication module 192 of FIG. 1 or a communication processor 220 or a wireless communication module 230 of FIG. 2) may identify whether the electronic device is connected with a network and performs wireless communication in operation 1601. According to an embodiment of the disclosure, a wireless communication module 230 may identify whether an electronic device 101 accesses a network (for example: a base station) and transmits or receives data through the network.

According to various embodiments of the disclosure, in case that an electronic device (for example: a processor 120 or 210) is not connected to a network (for example: "No" in operation 1601), power supply of an electronic device 101 to an internal circuit, based on a voltage conversion mode corresponding to a load current, may be maintained. According to an embodiment of the disclosure, in case that wireless communication is not performed, a power management module 240 may terminate power supply to a communication processor 220.

According to various embodiments of the disclosure, in case that an electronic device (for example: a processor 120 or 210) is connected to a network and performs wireless communication (for example: "Yes" in operation 1601), in operation 1603, it may be identified whether wireless communication with a network is configure to URLLC. According to an embodiment of the disclosure, in case that an MCS-C-RNTI is received through RRC signaling with a network, a processor 210 may determine that wireless communication with the network is configured to URLLC.

According to various embodiments of the disclosure, in case that wireless communication with a network is configured to URLLC (for example: "Yes" in operation 1603), in operation 1605, an electronic device (for example: a processor 120 or 210) may configure a voltage conversion mode of a DC-DC conversion module 242 to a PWM mode. According to an embodiment of the disclosure, in case that wireless communication with a network is configured to URLLC, a processor 210 may determine that wireless communication with the network is sensitive to interference due to a PFM mode. Accordingly, a processor 210 may configure a voltage conversion mode of a DC-DC conversion module 242 to a PWM mode.

According to various embodiments of the disclosure, in case that wireless communication with a network is not configured to URLLC (for example: "No" in operation 1603), in operation 1607, an electronic device (for example: a processor 120 or 210) may configure a voltage conversion mode of a DC-DC conversion module 242 to a PFM mode. According to an embodiment of the disclosure, in case that wireless communication with a network is not configured to URLLC, a processor 210 may determine that wireless communication with the network is insensitive to interference due to a PFM mode. Accordingly, a processor 210 may configure a voltage conversion mode of a DC-DC conversion module 242 to a PFM method.

Figure 17:
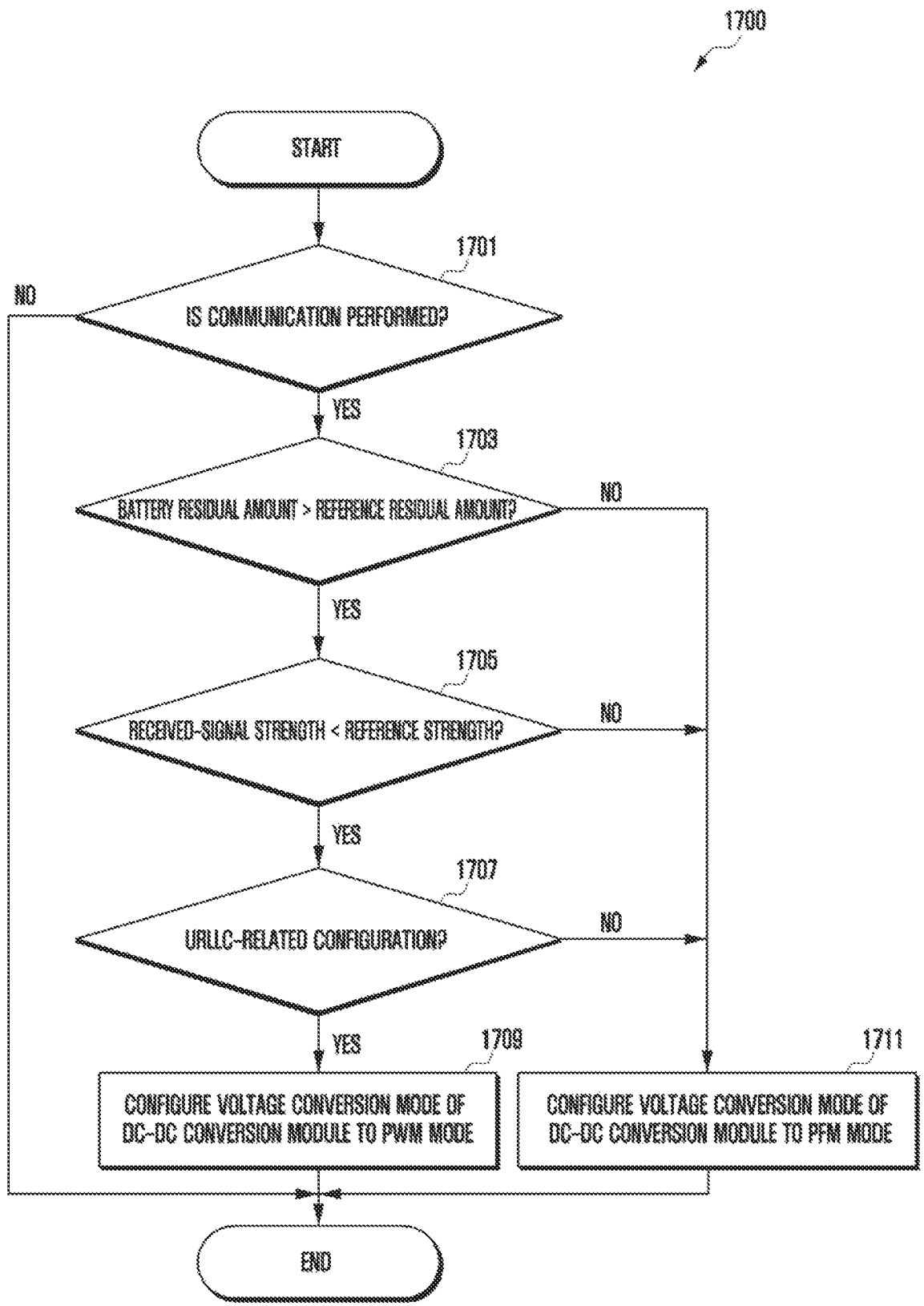
FIG. 17 is a flowchart for configuring, based on a battery residual amount and a communication state, a voltage conversion mode in an electronic device according to an embodiment of the disclosure.

FIG. 17 is a flowchart 1700 for configuring, based on a battery residual amount and a communication state, a voltage conversion mode in an electronic device according to an embodiment of the disclosure. In embodiments below, respective operations may be performed sequentially, but are not necessarily performed sequentially. For example, the sequential position of each operation may be changed, and at least two operations may be performed in parallel. For example, an electronic device may be an electronic device 101 of FIG. 1 or FIG. 2.

Referring to FIG. 17, according to various embodiments of the disclosure, an electronic device (for example: a processor 120 or a wireless communication module 192 of FIG. 1 or a communication processor 220 or a wireless communication module 230 of FIG. 2) may identify whether the electronic device accesses a network and performs wireless communication in operation 1701. According to an embodiment of the disclosure, an electronic device 101 may establish a wireless channel by accessing a network (for example: a base station) through a wireless communication module 192. A wireless communication module 192 may transmit or receive data through a wireless channel with a network.

According to various embodiments of the disclosure, in case that wireless communication is not performed (for example: "No" in operation 1701), an electronic device (for example: a processor 120 or 210) may maintain a voltage conversion mode of an electronic device 101. According to an embodiment of the disclosure, a power management module 240 may supply power converted to a voltage of a predetermined level, based on a voltage conversion mode corresponding to a load current, to an internal circuit of an electronic device 101.

According to various embodiments of the disclosure, in case that wireless communication is performed through a network (for example: "Yes" in operation 1701), in operation 1703, an electronic device (for example: a processor 120 or 210) may identify whether a battery residual amount of an electronic device 101 exceeds a reference residual amount. According to an embodiment of the disclosure, a battery residual amount of an electronic device 101 may be periodically identified.

According to various embodiments of the disclosure, in case that a battery residual amount of an electronic device 101 exceeds a reference residual amount (for example: "Yes" in operation 1703), in operation 1705, an electronic device (for example: a processor 120 or 210) may be identify whether a received signal strength is smaller than a reference strength. As an example, a received signal strength may include at least one among reference signal received power (RSRP), a received signal strength indicator (RSSI), or a reference signal received quality (RSRQ).

According to various embodiments of the disclosure, in case that a received signal strength is smaller than a reference strength (for example: "Yes" in operation 1705), in operation 1707, an electronic device (for example: a processor 120 or 210) may identify whether wireless communication with a network is configured to URLLC. As an example, whether to configure URLLC may be determined based on whether an MCS-C-RNTI is received through RRC signaling with a network.

According to various embodiments of the disclosure, in case that wireless communication with a network is configured to URLLC (for example: "Yes" in operation 1707), in operation 1709, an electronic device (for example: a processor 120 or 210) may configure a voltage conversion mode of a DC-DC conversion module 242 to a PWM mode. According to an embodiment of the disclosure, in case that a battery residual amount exceeds a reference residual amount, a received signal strength is smaller than a reference strength, and wireless communication with a network is configured to URLLC, a processor 210 may configure a voltage conversion mode of a DC-DC conversion module 242 to a PWM mode.

According to various embodiments of the disclosure, in case that a battery residual amount of an electronic device 101 is equal to or smaller than a reference residual amount (for example: "No" in operation 1703), a received signal strength exceeds a reference strength (for example: "No" in operation 1705), or wireless communication with a network is not configured to URLLC (for example, "No" in operation 1707), in operation 1711, an electronic device (for example, a processor 120 or 210) may configure a voltage conversion mode of a DC-DC conversion module 242 to a PFM mode. According to an embodiment of the disclosure, a processor 210 may configure a voltage conversion mode of a DC-DC conversion module 242 to a PFM mode so as to continuously maintain a certain service.

According to various embodiments of the disclosure, a method for operating an electronic device (for example: an electronic device 101 of FIG. 1 or FIG. 2) may include: identifying a modulation order used for communication with an external device, in case that communication with the external device is performed using a wireless resource, and configuring, based on the modulation order, a voltage conversion mode of a power management module that supplies power to a communication processor included in the electronic device to a pulse frequency modulation (PFM) mode or a pulse width modulation (PWM) mode.

According to various embodiments of the disclosure, the configuring of the voltage conversion mode may include: configuring a voltage conversion mode of the power management module to the PWM mode in case that the modulation order satisfies a designated condition, and configuring a voltage conversion mode of the power management module to the PFM mode in case that the modulation order does not satisfy the designated condition.

According to various embodiments of the disclosure, the voltage conversion mode may include a voltage conversion mode of a direct-current/direct-current (DC-DC) converter included in the power management module.

According to various embodiments of the disclosure, the identifying of the modulation order may include identifying, based on at least one among a channel quality indicator (CQI) index or a modulation coding scheme (MCS) index, a modulation order used for communication with the external device.

According to various embodiments of the disclosure, the configuring of the voltage conversion mode may include configuring, based on at least one among the modulation order, a load current, or a signal-to-interference-and-noise ratio (SINR) of a physical layer, the voltage conversion mode to the PFM mode or the PWM mode.

According to various embodiments of the disclosure, a method for operating an electronic device (for example: an electronic device 101 of FIG. 1) may include: identifying whether communication with an external device has been configured to ultra-reliable low latency communication (URLLC) in case that communication with the external device is performed using a wireless resource, and configuring, based on whether the URLLC has been configured, a voltage conversion mode of a power management module that supplies power to a communication processor included in the electronic device to a pulse frequency modulation (PFM) mode or a pulse width modulation (PWM) mode.

According to various embodiments of the disclosure, the configuring of the voltage conversion mode may include: configuring a voltage conversion mode of the power management module to the PWM mode in case that communication with the external device has been configured to URLLC, and configuring a voltage conversion mode of the power management module to the PFM mode in case that communication with the external device has not been configured to URLLC.

According to various embodiments of the disclosure, the voltage conversion mode may include a voltage conversion mode of a direct-current/direct-current (DC-DC) converter included in the power management module.

According to various embodiments of the disclosure, the identifying of whether communication with the external device has been configured to URLLC may include determining, based on whether a modulation-coding-scheme-cell-radio-network temporary identifier (MCS-C-RNTI) is included in radio resource control (RRC) signaling, whether communication with the external device has been configured to URLLC.

According to various embodiments of the disclosure, the configuring of the voltage conversion mode may include configuring, based on whether communication with the external device has been configured to URLLC and a battery residual amount of the electronic device, the voltage conversion mode to the PFM mode or the PWM mode.

According to various embodiments of the disclosure, based on at least one among a modulation order, a battery residual amount, an L1-SINR, or a communication state (for example: whether URLLC is configured) according to wireless communication, an electronic device may configure a voltage conversion mode of a DC-DC converter to a PWM mode or a PFM mode, thereby maintaining a relatively high transmission rate while reducing current consumption of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a power management module;
   a communication processor; and
   at least one processor operably connected to the communication processor,
   wherein the at least one processor is configured to:
      identify, based on at least one of a channel quality indicator (CQI) index or a modulation coding scheme (MCS) index, a modulation order used for communication with an external device, in a case that communication with the external device is performed using a wireless resource, and
      configure, based on the modulation order, a voltage conversion mode of the power management module that supplies power to the communication processor to a pulse frequency modulation (PFM) mode or a pulse width modulation (PWM) mode.

2. The electronic device of claim 1, wherein the at least one processor is further configured to:
   configure the voltage conversion mode of the power management module to the PWM mode in a case that the modulation order satisfies a designated condition, and
   configure the voltage conversion mode of the power management module to the PFM mode in a case that the modulation order does not satisfy the designated condition.

3. The electronic device of claim 1,
   wherein the power management module comprises a direct-current/direct-current (DC-DC) converter, and
   wherein the voltage conversion mode comprises a voltage conversion mode of the DC-DC converter.

4. The electronic device of claim 1, wherein the at least one processor is further configured to configure the voltage conversion mode to the PFM mode or the PWM mode by additionally considering at least one of a load current or a signal-to-interference-and-noise ratio (SINR) of a physical layer.

5. An electronic device comprising:
   a power management module;
   a communication processor; and
   at least one processor operably connected to the communication processor,
   wherein the at least one processor is configured to:

identify whether communication with an external device has been configured to ultra-reliable low latency communication (URLLC) in a case that communication with the external device is performed using a wireless resource, and configure, based on whether the URLLC has been configured, a voltage conversion mode of the power management module that supplies power to the communication processor to a pulse frequency modulation (PFM) mode or a pulse width modulation (PWM) mode.

6. The electronic device of claim 5, wherein the at least one processor is further configured to:

configure the voltage conversion mode of the power management module to the PWM mode in a case that communication with the external device has been configured to the URLLC, and configure the voltage conversion mode of the power management module to the PFM mode in a case that communication with the external device has not been configured to the URLLC.

7. The electronic device of claim 5, wherein the power management module comprises a direct-current/direct-current (DC-DC) converter, and wherein the voltage conversion mode comprises a voltage conversion mode of the DC-DC converter.

8. The electronic device of claim 5, wherein the at least one processor is further configured to determine, based on whether a modulation-coding-scheme-cell-radio-network temporary identifier (MC S-C-RNTI) is included in radio resource control (RRC) signaling, whether communication with the external device has been configured to the URLLC.

9. The electronic device of claim 5, wherein the at least one processor is further configured to configure the voltage conversion mode to the PFM mode or the PWM mode by additionally considering a battery residual amount of the electronic device.

10. A method for operating an electronic device, the method comprising:

identifying, based on at least one of a channel quality indicator (CQI) index or a modulation coding scheme (MCS) index, a modulation order used for communication with an external device, in a case that communication with the external device is performed using a wireless resource; and configuring, based on the modulation order, a voltage conversion mode of a power management module that supplies power to a communication processor included in the electronic device to a pulse frequency modulation (PFM) mode or a pulse width modulation (PWM) mode.

11. The method of claim 10, wherein the configuring of the voltage conversion mode comprises:

configuring the voltage conversion mode of the power management module to the PWM mode in a case that the modulation order satisfies a designated condition; and configuring the voltage conversion mode of the power management module to the PFM mode in a case that the modulation order does not satisfy the designated condition.

12. The method of claim 10, wherein the voltage conversion mode comprises a voltage conversion mode of a direct-current/direct-current (DC-DC) converter included in the power management module.

13. The method of claim 10, wherein the configuring of the voltage conversion mode comprises configuring, based on at least one of the modulation order, a load current, or a signal-to-interference-and-noise ratio (SINR) of a physical layer, the voltage conversion mode to the PFM mode or the PWM mode.

14. A method for operating an electronic device, the method comprising:

identifying whether communication with an external device has been configured to ultra-reliable low latency communication (URLLC) in a case that communication with the external device is performed using a wireless resource; and configuring, based on whether the URLLC has been configured, a voltage conversion mode of a power management module that supplies power to a communication processor included in the electronic device to a pulse frequency modulation (PFM) mode or a pulse width modulation (PWM) mode.

15. The method of claim 14, wherein the configuring of the voltage conversion mode comprises:

configuring the voltage conversion mode of the power management module to the PWM mode in a case that communication with the external device has been configured to the URLLC; and configuring the voltage conversion mode of the power management module to the PFM mode in a case that communication with the external device has not been configured to the URLLC.

16. The method of claim 14, wherein the voltage conversion mode comprises a voltage conversion mode of a direct-current/direct-current (DC-DC) converter included in the power management module.

17. The method of claim 14, wherein the identifying of whether communication with the external device has been configured to the URLLC comprises determining, based on whether a modulation-coding-scheme-cell-radio-network temporary identifier (MCS-C-RNTI) is included in radio resource control (RRC) signaling, whether communication with the external device has been configured to the URLLC.

18. The method of claim 14, wherein the configuring of the voltage conversion mode comprises configuring, based on whether communication with the external device has been configured to the URLLC and a battery residual amount of the electronic device, the voltage conversion mode to the PFM mode or the PWM mode.

* * * * *